(12) United States Patent
Lin et al.

(10) Patent No.: US 12,400,404 B2
(45) Date of Patent: Aug. 26, 2025

(54) APPLYING STORED DIGITAL MAKEUP ENHANCEMENTS TO RECOGNIZED FACES IN DIGITAL IMAGES

(71) Applicant: Google LLC, Mountain View, CA (US)

(72) Inventors: Shengyi Lin, Mountain View, CA (US); Leslie Tsu-Hwa Shaw, Menlo Park, CA (US); Marius Renn, Milpitas, CA (US); Nisha Masharani, Redwood City, CA (US); Sushil Nath, Mountain View, CA (US)

(73) Assignee: Google LLC, Mountain View, CA (US)

( * ) Notice: Subject to any disclaimer, the term of this patent is extended or adjusted under 35 U.S.C. 154(b) by 289 days.

(21) Appl. No.: 18/001,881

(22) PCT Filed: Jun. 18, 2021

(86) PCT No.: PCT/US2021/070728
§ 371 (c)(1),
(2) Date: Dec. 15, 2022

(87) PCT Pub. No.: WO2021/263264
PCT Pub. Date: Dec. 30, 2021

(65) Prior Publication Data
US 2023/0230325 A1   Jul. 20, 2023

Related U.S. Application Data

(60) Provisional application No. 63/043,276, filed on Jun. 24, 2020.

(51) Int. Cl.
| | |
|---|---|
| G06T 19/00 | (2011.01) |
| G06V 40/16 | (2022.01) |
| H04N 23/63 | (2023.01) |

(52) U.S. Cl.
CPC ............ *G06T 19/00* (2013.01); *G06V 40/168* (2022.01); *G06V 40/172* (2022.01); *H04N 23/632* (2023.01); *G06T 2200/24* (2013.01)

(58) Field of Classification Search
CPC .......................... G06V 40/168; G06T 2200/24
See application file for complete search history.

(56) References Cited

U.S. PATENT DOCUMENTS

| 7,612,794 B2 | 11/2009 | He et al. |
| 10,431,010 B2 | 10/2019 | Yang et al. |

(Continued)

FOREIGN PATENT DOCUMENTS

WO    2018014540 A1    1/2018

OTHER PUBLICATIONS

Response to Communication Pursuant to Rules 161(1) and 162 EPC dated Dec. 2, 2022, from counterpart European Application No. 21740641.2, filed May 18, 2023, 22 pp.

(Continued)

*Primary Examiner* — Ming Wu
(74) *Attorney, Agent, or Firm* — Shumaker & Sieffert, P.A.

(57) ABSTRACT

An example method includes outputting, by a computing device for display, one or more digital images that include a face of a user, receiving, by the computing device and based on a facial recognition process, an indication of a match between facial data associated with the face of the user and reference facial data associated with a face of an enrolled user of the computing device, and retrieving, by the computing device, digital makeup enhancement data that is associated with the reference facial data. The example method further includes applying, by the computing device, the digital makeup enhancement data to the facial data, of tire face of the user to generate one or more modified digital (Continued)

images that indicate at least one corresponding digital makeup enhancement to the face of the user, and outputting, by the computing device for display, the one or more modified digital images.

19 Claims, 9 Drawing Sheets

(56) References Cited

U.S. PATENT DOCUMENTS

| | | | | |
|---|---|---|---|---|
| 2014/0341425 | A1* | 11/2014 | Babacan | G06T 11/60 |
| | | | | 382/103 |
| 2018/0260983 | A1* | 9/2018 | Taoka | G06Q 30/06 |
| 2018/0350144 | A1* | 12/2018 | Rathod | G06Q 20/3224 |
| 2019/0034701 | A1* | 1/2019 | Kerger | H04N 7/15 |
| 2019/0292367 | A1* | 9/2019 | Dutta | C08L 65/02 |
| 2019/0362521 | A1 | 11/2019 | Kuo et al. | |

OTHER PUBLICATIONS

Alashkar et al., "Examples-ruled guided deep neural network for makeup recommendation," 31st AAAI Conference on Artificial Intelligence, Feb. 12, 2017, pp. 941-947.

International Search Report and Written Opinion of International Application No. PCT/US2021/070728, dated Oct. 12, 2021, 12 pp.

Lin et al., "Applying Virtual Makeup Using Makeup Detection and Recommendations," Technical Disclosure Commons, May 2021, 10 pp.

International Preliminary Report on Patentability from International Application No. PCT/US2021/070728 dated Jan. 5, 2023, 8 pp.

Notice of Intent to Grant and Text Intended to Grant from counterpart European Application No. 21740641.2 dated Mar. 24, 2025, 104 pp.

* cited by examiner

APPLYING STORED DIGITAL MAKEUP ENHANCEMENTS TO RECOGNIZED FACES IN DIGITAL IMAGES

This application claims the benefit of U.S. Provisional Patent Application No. 63/043,276, filed Jun. 24, 2020, the entire content of which is hereby incorporated by reference.

BACKGROUND

Many existing computing devices, including mobile computing devices, may be configured to execute software that enables users to apply various digital filters to alter the appearance of digital representations of faces that are displayed in one or more digital images. Certain applications, such as face-editing tools, may provide one or more filters that are used to apply virtual or digital enhancements to such faces. For example, a user may use a camera device to view a digital image of the user, and the user may utilize a face-editing tool to select a particular filter that is used to apply one or more digital enhancements to the user's face (e.g., digital enhancements to digital representations of the user's eyes or cheeks that are shown in the image). As another example, a user may utilize a similar face-editing tool to select and apply certain digital enhancements to faces included in previously stored digital images, such as images from a photo album.

SUMMARY

The present disclosure is directed to techniques for identifying a digital representation of a face of a user in an image and applying digital makeup enhancements to the digital representation of the face based on previously saved enhancement settings for that particular user, which may be stored, e.g., locally on a computing device after previously receiving consent from the user. Thus, the computing device may, with user consent, store customized digital makeup enhancements for various different users of the device, and may also potentially store different groups of customized enhancements for each individual user. The device may then be configured to identify a digital representation of a face within an image (e.g., within a real-time image or video, within a previously saved image included in a photo album), and to apply the previously saved digital makeup enhancements to the digital representation of the face of the user in order to generate a modified image, where the modified image indicates corresponding makeup enhancements to the digital representation of the face.

In one example, a method includes outputting, by a computing device and for display, one or more digital images that include a digital representation of a face of a user, receiving, by the computing device and based on a facial recognition process, an indication of a match between facial data associated with the digital representation of the face of the user and reference facial data associated with a digital representation of a face of an enrolled user, wherein the reference facial data is associated with digital makeup enhancement data previously stored for the enrolled user, and retrieving, by the computing device, the digital makeup enhancement data that is associated with the reference facial data. The example method further includes applying, by the computing device, the digital makeup enhancement data to the facial data of the digital representation of the face of the user to generate one or more modified digital images that indicate at least one corresponding digital makeup enhancement to the digital representation of the face of the user, and outputting, by the computing device and for display, the one or more modified digital images.

In another example, a computing device includes a display device, at least one processor, and a computer-readable storage device. The computer-readable storage device is configured to store instructions that are executable by the at least one processor to: output, for display at the display device, one or more digital images that include a digital representation of a face of a user; receive, based on a facial recognition process, an indication of a match between facial data associated with the digital representation of the face of the user and reference facial data associated with a digital representation of a face of an enrolled user, wherein the reference facial data is associated with digital makeup enhancement data previously stored for the enrolled user; retrieve the digital makeup enhancement data that is associated with the reference facial data; apply the digital makeup enhancement data to the facial data of the digital representation of the face of the user to generate one or more modified digital images that indicate at least one corresponding digital makeup enhancement to the digital representation of the face of the user; and output, for display at the display device, the one or more modified digital images.

In another example, a computer-readable storage device storing instructions that, when executed, cause at least one processor of a computing device to perform operations. These example operations include outputting, for display, one or more digital images that include a digital representation of a face of a user, receiving, based on a facial recognition process, an indication of a match between facial data associated with the digital representation of the face of the user and reference facial data associated with a digital representation of a face of an enrolled user, wherein the reference facial data is associated with digital makeup enhancement data previously stored for the enrolled user, and retrieving the stored digital makeup enhancement data that is associated with the reference facial data. The example operations further include applying the stored digital makeup enhancement data to the facial data of the digital representation of the face of the user to generate one or more modified digital images that indicate at least one corresponding digital makeup enhancement to the digital representation of the face of the user, and outputting, for display, the one or more modified digital images.

The details of one or more examples are set forth in the accompanying drawings and the description below. Other features, objects, and advantages of the disclosure will be apparent from the description and drawings, and from the claims.

DETAILED DESCRIPTION

Figure 1:
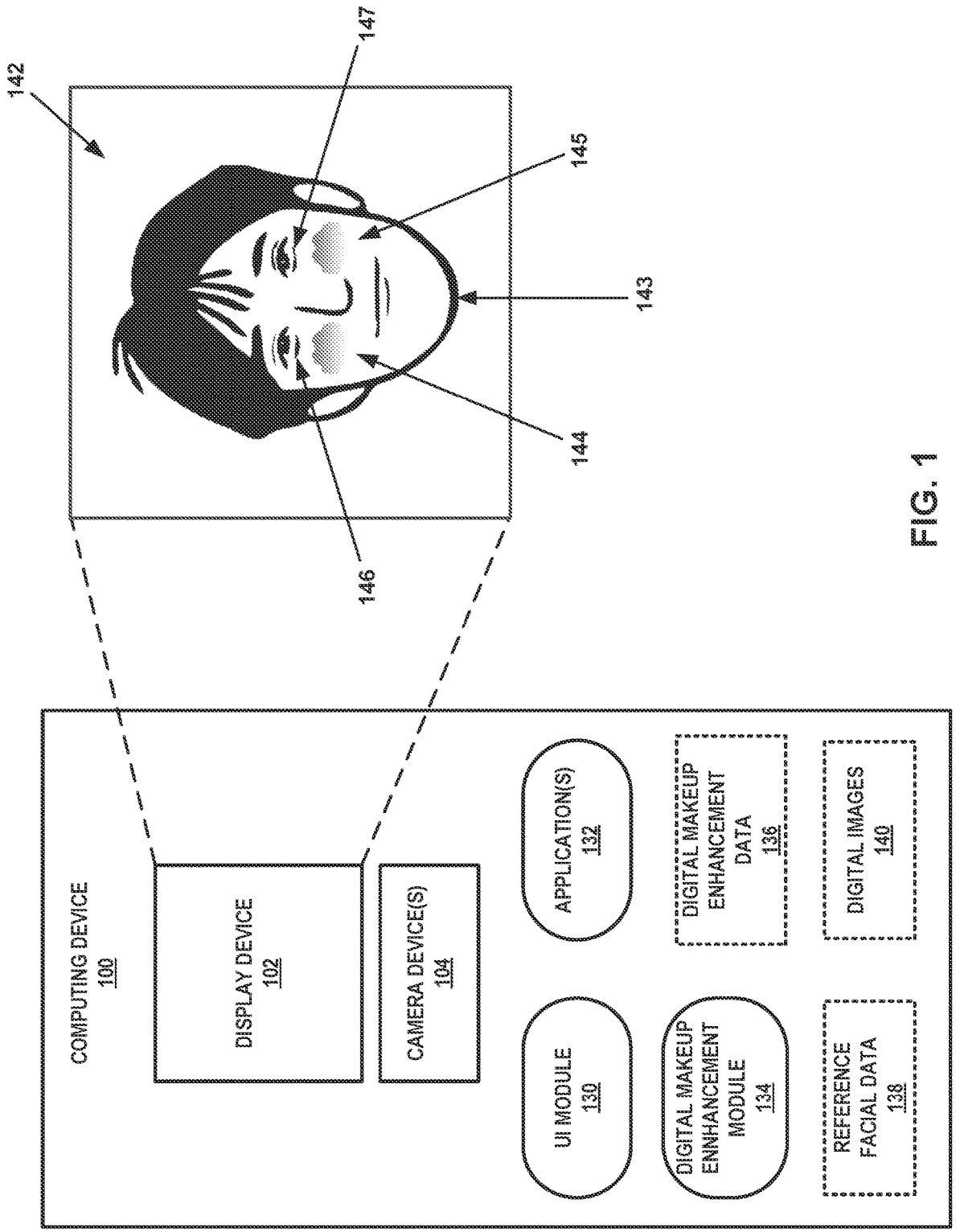
FIG. 1 is a conceptual diagram illustrating an example computing device that is configured to apply digital makeup enhancement data to facial data of a recognized digital representation of a face of a user that is included in one or more digital images, in accordance with one or more aspects of the present disclosure.

FIG. 1 is a conceptual diagram illustrating an example computing device 100 that is configured to apply digital makeup enhancement data to facial data of a recognized digital representation of a face 143 of a user that is included in one or more digital images, such as a digital image 142, in accordance with one or more aspects of the present disclosure. Examples of computing device 100 may include, but are not limited to, a mobile phone, a tablet computer, a personal digital assistant (PDA), a laptop computer, a portable gaming device, a portable media player, a wearable computing device (e.g., a watch, a wrist-mounted computing device, a head-mounted computing device), a television platform, or other type of computing device. As will be described in further detail below, computing device 100 may be or include one or more processors. Computing device 100 includes a display device 102 and one or more camera devices 104, and computing device may be configured to execute one or more applications 132.

As shown in FIG. 1, display device 102 (e.g., a presence-sensitive display device) is configured to output one or more images for display, such as image 142 that includes a digital representation of a face 143 of a user. Face 143 may comprise a graphical or digital representation of the real-life face of the user. Throughout this disclosure, for ease of explanation, any such digital representation of a face, such as face 143, may be referred to herein simply as a "face." In various instances, the user may wish to use computing device 100 to apply one or more digital filters to alter the appearance of face 143 displayed in image 142. For instance, computing device 100 may execute software to apply one or more digital makeup enhancements (e.g., virtual makeup) to face 143. Certain existing applications, such as face-editing tools, include one or more filters that may be used to apply this type of virtual makeup to face 143.

For example, if the user wishes to use camera device 104 to take a photo of the user (e.g., a selfie), the user may utilize a traditional face-editing tool to select a particular filter to obtain a real-time preview of the filter as it is applied to face 143 at image capture time. In this example, the selected filter may include a combination of one or more digital makeup enhancements (e.g., digital enhancements for the eyes and cheeks). However, this traditional filter will typically be applied to all faces that are included in image 142. Although only one such face 143 is shown in the example of FIG. 1, image 142 may include any number of one or more faces. The selected filter will often be applied to all of the detected faces in image 142. Thus, when camera device 104 is activated to take a snapshot, the selected filter will be applied to all of the faces in the captured digital photo. However, this result does not allow customization of digital makeup application on a face-by-face basis.

The user may also use traditional face-editing tools to modify images within previously captured digital photos. In these cases, the user may select a particular image that is to be edited, as well as a particular face included in the image. The user may then select the digital makeup enhancements that are to be applied to the face, and may even adjust the strengths or other related settings of the digital makeup enhancements that are applied. However, the user must repeat these actions for each individual face in the image for which digital makeup is applied in order to selectively apply different or customized digital enhancements on a face-by-face basis.

With these types of traditional face-editing tools, therefore, it is apparent that users may not have the flexibility of allowing a computing device to automatically apply different digital makeup enhancements on different faces during image capturing time (e.g., when taking photos or selfies with camera device 104), and users may need to manually repeat various steps to apply customized digital makeup enhancements to different faces that are included within previously captured images. However, by instead utilizing one or more techniques of the present disclosure, computing device 100 may use a digital makeup enhancement module 134 to create, save, and later automatically apply (e.g., for a live, real-time preview of) different digital makeup enhancements for different recognized user faces, including three-dimensional makeup enhancements. Digital makeup enhancement module 134 may comprise a stand-alone application or may be integrated with one or more of applications 132 (e.g., with a camera application and/or a photo album application).

For example, one or more techniques of the present disclosure utilize a more simplified approach for enabling computing device 100 to apply digital makeup enhancements (e.g., two-dimensional or three-dimensional enhancements) to faces that are included in digital images. As will be described in further detail below, digital makeup enhancement module 134 may first perform various setup operations to create and store digital makeup enhancement data for each individual enrolled user, where the data may be stored based on user consent. For example, during execution of digital makeup enhancement module 134, a user may select the enrolling user's face included in an image (e.g., a real-time image output at display device 102, a previously stored image that is included in digital images 140 stored either locally or remotely in the cloud). The facial data (e.g., feature data) for this selected face may, with a user's knowledge and consent, be stored in reference facial data 138, locally on computing device 100 or, in some alternate examples, in the cloud (which is another way of referring to one or more external servers that are communicatively coupled to computing device 100 via one or more networks).

The user may select one or more digital makeup enhancements that are to be applied to the face, and the user may, in various cases, view a live, real-time preview of these enhancements as applied to the face. These enhancements are stored within digital makeup enhancement data 136, either locally or in the cloud. This setup may, in various cases, be performed once for each individual face that is to be customized with digital makeup enhancements. In some cases, as will be described in more detail below, a user may even store multiple different enhancement settings that are associated with the same enrolled user (e.g., first makeup enhancement data associated with personal use, second makeup enhancement data associated with business use, etc.). The storage of user data such as facial data, image data, and/or digital makeup enhancement data associated with a user may only occur, in various examples, in response to computing device 100 (e.g., via UI module 130) receiving an affirmative consent from the user. UI module 130 may, for example, provide an explicit request to the user regarding the storage and subsequent use of such data, and computing device 100 may proceed to store the data either locally or in the cloud only upon receiving (e.g., via module 130) an affirmative response and consent from the user.

After computing device 100 saves digital makeup enhancement data 136, either locally on computing device 100 (e.g., digital makeup enhancement data 136) or remotely in the cloud, computing device 100 may subsequently use or execute digital makeup enhancement module 134 (e.g., while using camera devices 104 or while accessing stored images in a photo album) to apply, in response to a user request, customized digital makeup enhancements stored in the digital makeup enhancement data to one or more recognized faces that have different associated enhancement data. For example, while using camera devices 104, computing device 100 may output, for display (e.g., at display device 102), one or more real-time images captured by camera devices 104. Digital makeup enhancement module 134 may then apply digital makeup enhancement data 136 to the facial data of the digital representation of the face of the user to generate the one or more modified digital images, where the one or more modified digital images comprise one or more modified real-time images. Computing device 100 may then output, for display (e.g., at display device 102), the one or more modified real-time images to provide a live preview of the at least one corresponding digital makeup enhancement to the digital representation of the face of the user.

As a result, computing device 100 may store customized digital makeup enhancements for various different enrolled users of computing device 100, and may also potentially store different groups of customized enhancements for each individual user. In the example of FIG. 1, digital makeup enhancement module 134 has applied data for four different digital makeup enhancements to the digital representation of face 143: a first digital makeup enhancement 144 to one cheek of the user, a second digital makeup enhancement 145 to another cheek of the user, a third digital makeup enhancement 146 underneath one eye of the user, and a fourth digital makeup enhancement 147 underneath another eye of the user.

In some examples, users of the same computing device or of different computing devices may share saved enhancement settings, which may be associated with one or more of these users. This makeup sharing feature may be performed by, e.g., applications 132 and/or digital makeup enhancement module 134 via one or more sharing operations. Using such a feature, any user of computing device 100 may share the user's digital makeup enhancement data 136 for use on any other device (e.g., another device external to but communicatively coupled to computing device 100, such as via one or more wired and/or wireless networks). As a result, in these cases, digital makeup enhancement data 136 of a user of computing device 100 may be shared, stored, and used on another external device and applied to any live or stored image that includes this user's face. In addition, any user of computing device 100 may also request receipt of digital makeup enhancement data that is stored on another device and associated with another user, such that this data may also be stored on computing device 100 within digital makeup enhancement data 136 and used in applying corresponding makeup enhancements to any live or stored image that includes the face of this other user.

For example, if a "user A" has stored makeup enhancement settings for "user A" in digital makeup enhancement data 136, "user A" may use one or more sharing operations to share these customized makeup enhancement settings with a friend, "user B," who uses another device, so that "user B" may use this other device to apply these settings for any images (e.g., live or stored images) that may include one or more images of "user A." To do so, "user B" may use the other device to send, to computing device 100, a share request for the customized makeup enhancement settings of "user A" that are stored in digital makeup enhancement data 136. Upon receiving this request, computing device 100 (e.g., using UI module 130) may receive from "user A" a consent or approval to share these settings with "user B." Computing device 100 may then send to the device of "user B" (e.g., via one or more wireless or wired connections) the digital makeup enhancement data 136 for "user A." In some cases, computing device 100 may send this data upon receiving approval from "user A," whether or not computing device 100 receives an explicit request from the device of "user B."

When the device of "user B" receives the makeup settings for "user A," this device may store and associate these settings with "user A" (e.g., based on a unique user identifier for "user A"). At this point, the device of "user B" may apply the makeup enhancement settings for "user A" to any image (e.g., a live image, a stored photo-album image) that includes "user A" to obtain images with customized makeup that is applied to the face of "user A," based on the specific digital makeup enhancement data that was previously selected and saved by "user A" on computing device 100. In some cases, if "user B" likes or wants to use these particular settings on the face of "user B," "user B" may apply and store these same settings on the device in association with the face of "user B," such that these customized settings are also applied to the face of "user B" that may be included in any image (e.g., a live image, a stored photo-album image).

Similarly, "user A" of computing device 100 may send a share request to the device of "user B" to obtain a copy of the customized makeup settings of "user B" that are stored on the device of "user B." Upon "user B" approving the request, the device of "user B" may send these customized settings to computing device 100. Computing device 100 may store and associate these settings with "user B" (e.g., based on a unique user identifier for "user B"). Digital makeup enhancement module 134 may apply the makeup enhancement settings for "user B" to any image (e.g., a live image captured by camera devices 104, a stored photo-album image) that includes "user B" to obtain images with customized makeup that is applied to the face of "user B," based on the specific digital makeup enhancement data that was previously selected and saved by "user B." In addition, if "user A" likes or wants to use these particular settings, "user A" may apply and store these same settings in digital makeup enhancement data 136 in association with the face of "user A," such that these customized settings are also applied to the face of "user A" that may be included in any image.

In certain cases, various users may use or be associated with the same device. For instance, "user A" and "user B" may both be users of the same computing device 100. In these cases, "user A" and "user B" may each include respective customized makeup data in digital makeup enhancement data 136 that is saved on computing device 100. "User A" and/or "user B" may share their respective data with each other and/or with any other user for applying respective makeup enhancements in any images that include the face of "user A" or "user B." In addition, in certain cases, a first user may allow another user, based on received input, to generate or customize the makeup settings for the first user, such that these settings are then applied to any image of the first user. For instance, "user A" may allow or enable "user B" via a sharing operation to create or modify, based on input from "user B", any customized makeup settings in digital makeup enhancement data 136 for "user A." In this case, these generated makeup settings for "user A" may be applied to any image (e.g., live image, stored image) that includes the face of "user A." In such fashion, any given user is enabled to share that user's customized makeup enhancement setting data with one or more other users (e.g., friends), which may be applied to the face of that given user when included in an image, or which may in some cases be applied to a face of any friend of the given user.

Further to the descriptions above, a user may be provided with controls allowing the user to make an election as to both if and when systems, programs, or features described herein may enable collection and/storage of user information (e g., information about a user's social network, social actions, facial and/or image data, digital makeup enhancement data, user preference data, user location data), and/or if and when systems, programs, or features described herein may enable transmission of content or communications between devices. In addition, certain data may be treated in one or more ways before it is stored or used, so that identifiable information is removed. For example, a user's identity may be treated so that no identifiable information can be determined for the user, or a user's geographic location may be generalized where location information is obtained (such as to a city, ZIP code, or state level), so that a particular location of a user cannot be determined. Thus, the user may have control over what information is collected about the user, how that information is stored and/or used, and what information is provided to the user.

As shown in FIG. 1, computing device 100 includes display device 102. Display device 102 may function as an input device and/or an output device for computing device 100. Display device 102 may be implemented using various technologies. For instance, display device 102 may function as an input device using a presence-sensitive input device, such as a resistive touchscreen, a surface acoustic wave touchscreen, a capacitive touchscreen, a projective capacitance touchscreen, a presence-sensitive screen, an acoustic pulse recognition touchscreen, a presence-sensitive screen that detects motion via radar technology, or another presence-sensitive technology. Display device 102 may function as an output device using any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 100.

As one example, display device 102 of computing device 100 may include a presence-sensitive screen that may receive tactile input from a user of computing device 100. Display device 102 may receive indications of the tactile input by detecting one or more gestures from a user of computing device 100 (e.g., the user touching or pointing to one or more locations of display device 102 with a finger or a stylus pen). The presence-sensitive screen of display device 102 may also present output to a user. Display device 102 may present the output as or in a graphical user interface, which may be associated with functionality provided by computing device 100. For example, display device 102 may present output associated with various user interfaces of applications 132 executing at computing device 100. A user may interact with a respective user interface of each of applications 132 to cause computing device 100 to perform operations relating to corresponding application functionality.

Figure 2:
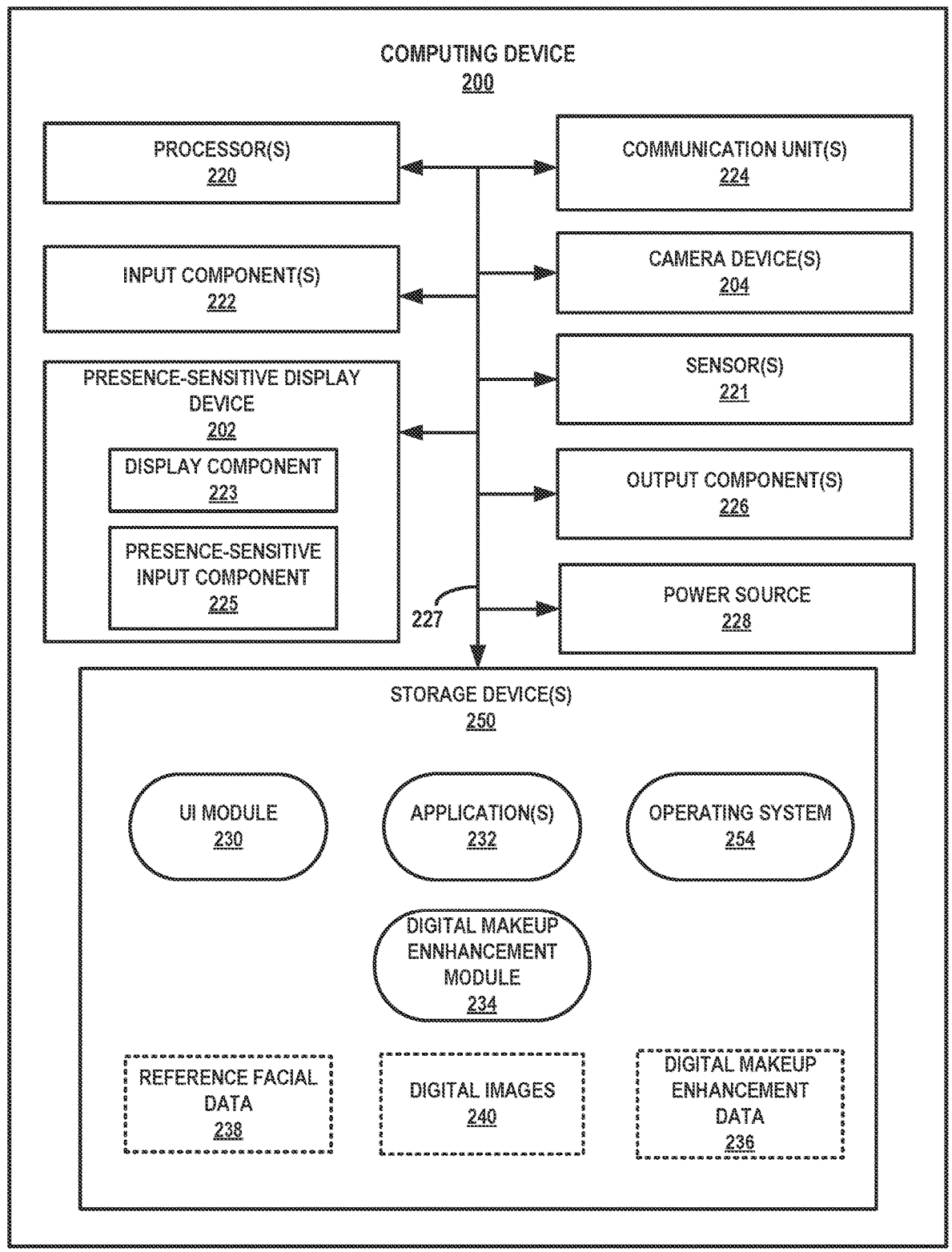
FIG. 2 is a block diagram illustrating an example computing device, in accordance with one or more aspects of the present disclosure.

In some examples, computing device 100 may include one or more communication units (such as shown in FIG. 2). These communication units may send data to and/or receive data from one or more other computing devices. In some examples, the communication units support wireless and/or wired communication, and they may send and/or receive data using any variety of communication protocols.

Computing device 100 may also include user interface ("UI") module 130 and digital makeup enhancement module 134. UI module 130, applications 132, and digital makeup enhancement module 134 may perform operations described herein using any combination of software, hardware, and/or firmware residing in and/or executing at computing device 100. Computing device 100 may execute modules 130, 134 and applications 132 using one or more processors. Computing device 100 may, in some cases, execute modules 130, 134 and applications 132 as one or more virtual machines executing on underlying hardware. Modules 130, 134 and applications 132 may be implemented in various ways. For example, any of modules 130, 134 and/or applications 132 may be implemented as a downloadable or pre-installed application or "app." In some examples, one of more of these may execute as a service of an operating system or computing platform.

Applications 132 of computing device 100 may perform various functions or access one or more services for computing device 100. An e-mail application, a camera application, a calendar application, a messaging application, a social media application, a travel application, a game application, a stock application, and a weather application are all examples of applications 132. UI module 130 may cause display device 102 to present a graphical user interface to a user. For example, the graphical user interface may include graphical elements (e.g., indications) displayed at various locations of display device 102.

UI module 130 may, in some cases, act as an intermediary between various components of computing device 100 to make determinations based on input detected by display device 102 and to generate output presented by display device 102. For instance, UI module 130 may receive information from display device 102 related to input detected by display device 102 and transmit the input information to one or more of applications 132. UI module 130 may also receive notification information and/or content from digital makeup enhancement module 134 and/or a camera application (e.g., one of applications 132). Such a camera application may control or otherwise interact with or manage camera devices 104. UI module 130 may provide content and/or other information associated with digital makeup enhancement module 134 or the camera application (e.g., digital image 142) to display device 102 for output to a user.

Computing device 100 further includes one or more camera devices 104. Camera devices 104 are configured to capture one or more images during execution of a camera application (e.g., one of applications 132), such as one or more still and/or moving images. In cases in which computing device 100 comprises a mobile computing device, camera devices 104 may include one or more camera devices on a front-side and/or on a rear-side of computing device 100. Examples of camera devices 104 are further described below in reference to FIG. 2.

According to one or more examples, and as further described below, computing device 100 may execute digital makeup enhancement module 134 to implement various techniques of the present disclosure. In some cases, digital makeup enhancement module 134 may comprise a stand-alone module that interacts with UI module 130 and/or applications 132. In other cases, digital makeup enhancement module 134 may be part of or integrated with UI module 130 or one or applications 132, such as a camera application.

Digital makeup enhancement module 134 may output, for display, one or more digital images (e.g., one or more still or moving images), which include a digital representation of face 143 of a user. As indicated earlier, face 143 may comprise a digital representation of a real-life face of the user, and thus, throughout this disclosure and for ease of explanation, any such digital representation of a face, such as face 143, may be referred to herein simply as a "face." In some cases, computing device 100 may use camera devices 104 to capture these images in real time. In other cases, computing device 100 may retrieve the digital images from a stored digital photo album, such as from digital images 140 shown in FIG. 1. One or more of digital images 140 may optionally be stored locally on computing device 100 or may be stored remotely in the cloud.

Digital makeup enhancement module 134 may receive, based on a facial recognition process (e.g., a process performed locally on computing device 100 or externally in the cloud), an indication of a match between facial data associated with face 143 of the user and reference facial data (e.g., reference facial data 138) associated with a face of an enrolled user, where the reference facial data is associated with digital makeup enhancement data previously stored for the enrolled user. This enrolled user is one who was previously enrolled on computing device 100, where computing device 100 has previously obtained digital makeup enhancement data associated with the reference facial data of this enrolled user, such that the digital makeup enhancement data has been previously stored either locally on computing device 100 (e.g., in digital makeup enhancement data 136) or remotely in the cloud. For instance, the user in the example of FIG. 1 may have previously enrolled his/her face with computing device 100. The reference facial data associated with the face of this enrolled user may be stored in reference facial data 138 and may be associated with the stored digital makeup enhancement data. In some optional cases, reference facial data 138 may be stored locally on computing device 100. In other cases, reference facial data 138 may be stored external from computing device 100 in the cloud.

As noted above, in some cases, computing device 100 (e.g., using one or more of applications 132 and/or digital makeup enhancement module 134) may perform one or more facial recognition processes locally on computing device 100. In these cases, computing device 100 may perform the facial recognition process on one or more digital images and retrieve reference facial data 138 associated with the face of the enrolled user. Computing device 100 may then compare the facial data associated with face 143 of the user to the reference facial data associated with the face of the enrolled user. Computing device 100 may then provide, based on the comparing, the indication of the match between the facial data associated with face 143 of the user and the reference facial data associated with the face of the enrolled user.

However, in other examples, one or more of these facial recognition processes may be performed remotely from computing device 100 in the cloud. For instance, computing device 100 may send, to an external device, information associated with the one or more digital images. Computing device 100 may then receive from the external device, based on the facial recognition process performed by the external device, the indication of the match between the facial data associated with face 143 of the user and the reference facial data associated with the face of the enrolled user.

After receiving the indication of the match between the facial data associated with face 143 of the user and reference facial data associated with the face of the enrolled user, digital makeup enhancement module 134 may retrieve digital makeup enhancement data that is associated with the reference facial data. This data may be included in digital makeup enhancement data 136 shown in FIG. 1. In some optional cases, digital makeup enhancement data 136 may be stored locally on computing device 100. In other cases, digital makeup enhancement data 136 may be stored externally from computing device 100 in the cloud.

After retrieval of this data, digital makeup enhancement module 134 may apply digital makeup enhancement data 136 to the facial data of face 143 of the user to generate one or more modified digital images, such as image 142 shown in FIG. 1, which indicate at least one corresponding digital makeup enhancement to face 143 of the user. Digital makeup enhancement module 134 may then output modified digital image 142 for display to the user. Any of the digital images output by digital makeup enhancement module 134 may comprise one or more still or moving images.

In various examples, digital makeup enhancement module 134 may use digital makeup enhancement data 136 to apply two-dimensional or three-dimensional makeup enhancements to face 143. For example, in some cases, digital makeup enhancement module 134 may apply a three-dimensional makeup rendering process with digital makeup enhancement data 136 to apply or provide three-dimensional makeup enhancements to face 143 when generating modified digital image 142. In these cases, camera devices 104 may or may not include a depth sensor. For instance, in examples where camera devices 104 do not include a depth sensor, the three-dimensional makeup rendering process may detect one or more facial landmarks in face 143 and construct a three-dimensional facial model, including a depth map model of facial information or related features, based on a source (e.g., red-green-blue) image. In various examples, digital makeup enhancement module 134 may use the three-dimensional makeup rendering process to apply makeup enhancements via a blending process with respect to the pixel values (e.g., pixel values for color, brightness) of the image(s). Thus, the rendering process may not necessarily make face 143 appear flat or remove any particular effects (e.g., depth effects, shadowing effects), but may instead take both the shape of face 143 and any effects such as depth or shadowing into account when performing the three-dimensional rendering process and applying the makeup enhancements to face 143. The rendering process use by digital makeup enhancement module 134 is therefore capable, in various examples, of applying three-dimensional makeup enhancements or effects to face 143 using digital makeup enhancement data 136.

Various different digital makeup enhancements may be saved and subsequently applied to face 143, and the data associated with these enhancements may be stored in digital makeup enhancement data 136. For instance, in the example of FIG. 1, four distinct digital makeup enhancements have been applied to face 143: a first digital makeup enhancement 144 to one cheek of the user, a second digital makeup enhancement 145 to another cheek of the user, a third digital makeup enhancement 146 underneath one eye of the user, and a fourth digital makeup enhancement 147 underneath another eye of the user. Each of these digital makeup enhancements may be represented or otherwise associated with corresponding data that is included in digital makeup enhancement data 136, which may indicate the type of makeup enhancement and corresponding attributes.

As one example, the first digital makeup enhancement 144 to a cheek of the user may comprise a foundation makeup enhancement of a particular color. The data that corresponds to this enhancement, as stored in digital makeup enhancement data 136, may indicate that the enhancement in a foundation makeup enhancement, and may further specify the attributes of this enhancement, such as the color, style, strength, and like (e.g., such as provided in one or more name/value pairs).

The stored digital makeup enhancement data corresponding to first digital makeup enhancement 144 may also be associated specifically with the face of the enrolled user (e.g., via a unique identifier of the face of this enrolled user), as well as particular reference facial data included in reference facial data 138 for this first digital makeup enhancement 144. For instance, first digital makeup enhancement 144 may be associated with reference facial data (e.g., one or more facial features) for one particular cheek of the enrolled user. The reference facial data may indicate one or more specific facial information or features, including facial location or region information (e.g., in one or more name/value pairs) associated with such features.

After receiving an indication that face 143 matches the face of the enrolled user, digital makeup enhancement module 134 may retrieve first digital makeup enhancement 144 for the enrolled user and identify a portion of face 143 that is associated with facial data corresponding to the reference facial data (e.g., one particular cheek) of first digital makeup enhancement 144. Digital makeup enhancement module 134 may then apply the data for first digital makeup enhancement 144 to this facial data of face 143 to apply this corresponding digital makeup enhancement 144 (e.g., foundation applied to the cheek of user 143).

Thus, the present disclosure is directed to techniques for identifying face 143 of a user in an image and applying digital makeup enhancements to face 143 based on previously saved digital makeup enhancement data 136 (e.g., setting data) for that particular user. Digital makeup enhancement module 134 may access customized digital makeup enhancements for various different users of computing device 100, and may also potentially access different groups of customized enhancements for each individual user, as will be described in further detail below. One or more techniques of the present disclosure may utilize a more simplified approach for enabling computing device 100 to automatically apply digital makeup enhancements to recognized faces that are included in digital images.

FIG. 2 is a block diagram illustrating an example computing device 200, in accordance with one or more aspects of the present disclosure. Computing device 200 may comprise one example of computing device 100 illustrated in FIG. 1. FIG. 2 illustrates only one particular example of computing device 200, and many other examples of computing device 200 may be used in other instances and may include a subset of the components included in example computing device 200 or may include additional components not shown in FIG. 2.

In the example of FIG. 2, computing device 200 includes presence-sensitive display device 202, one or more processors 220, one or more input components 222, one or more communication units 224, one or more output components 226, one or more camera devices 204, one or more sensors 221, a power source 228, and one or more storage devices 250. Communication channels 227 may interconnect each of the components 220, 222, 202, 224, 204, 221, 228, 226, and/or 250 for inter-component communications (physically, communicatively, and/or operatively). In some examples, communication channels 227 may include a system bus, a network connection, an inter-process communication data structure, or any other method for communicating data between hardware and/or software.

One or more input components 222 of computing device 200 may receive input, such as input from a user. Examples of input are touch/tactile, presence-sensitive, and audio input. Examples of input components 222 include a presence-sensitive screen, touch-sensitive screen, touchscreen, mouse, keyboard, trackpad, voice responsive system, video camera, microphone or any other type of device for detecting input from a human or machine.

One or more output components 226 of computing device 200 may generate output. Examples of output are haptic, audio, and visual output. Examples of output components 226 include a presence-sensitive screen, touch-sensitive screen, touchscreen, sound card, video graphics adapter card, speaker, cathode ray tube (CRT) display, liquid crystal display (LCD), haptic device, or any other type of device for generating output to a human or machine.

One or more communication units 224 of computing device 200 may communicate with external devices via one or more networks by transmitting and/or receiving network signals on the one or more networks (e.g., one or more wired and/or wireless networks). For example, computing device 200 may use communication units 224 to transmit and/or receive radio signals on a radio network such as a cellular radio network. Likewise, communication units 224 may transmit and/or receive satellite signals on a satellite network such as a global positioning system (GPS) network. Examples of communication units 224 include a network interface card (e.g. such as an Ethernet card), an optical transceiver, a radio frequency transceiver, a GPS receiver, or any other type of device that can send and/or receive information. Other examples of communication units 224 may include short wave radios, cellular data radios, wireless Ethernet network radios, as well as universal serial bus (USB) controllers.

Presence-sensitive display device 202 of computing device 200 includes display component 223 and presence-sensitive input component 225. In some examples, presence-sensitive display device 202 may provide output to a user using haptic, audio, or visual stimuli as described above with reference to output components 226. For example, display component 223 may provide display or video output as described with reference to output components 226. Presence-sensitive display device 202 may also provide input capabilities such as that described above with reference to input components 222. For example, presence-sensitive input component 225 may provide input capabilities as described with reference to input components 222.

Display component 223 may be a screen at which information is displayed by presence-sensitive display device 202, and presence-sensitive input component 225 may detect an object at and/or near display component 223. As one example range, presence-sensitive input component 225 may detect an object, such as a finger or stylus that is within two inches or less of display component 223. Presence-sensitive input component 225 may determine a location (e.g., an (x,y) coordinate) of display component 223 at which the object was detected. In another example range, presence-sensitive input component 225 may detect an object six inches or less from display component 223 and other ranges are also possible. Presence-sensitive input component 225 may determine the location of display component 223 selected by a user's finger using capacitive, inductive, radar-based, and/or optical recognition techniques. In some examples, presence sensitive input component 225 also provides output to a user using touch, presence-sensitive, audio, or video stimuli as described with respect to display component 223. Display component 223 may be any type of output device that provides visual output, such as described with respect to output components 226.

While illustrated as an internal component of computing device 200, presence-sensitive display device 202 may also represent an external component that shares a data path with computing device 200 for transmitting and/or receiving input and output. For instance, in one example, presence-sensitive display device 202 represents a built-in component of computing device 200 located within and physically connected to the external packaging of computing device 200 (e.g., a screen on a mobile phone). In another example, presence-sensitive display device 202 represents an external component of computing device 200 located outside and physically separated from the packaging of computing device 200 (e.g., a monitor and/or a projector that shares a wired and/or wireless data path with a tablet computer).

Presence-sensitive display device 202 of computing device 200 may detect two-dimensional and/or three-dimensional gestures as input from a user of computing device 200. For instance, a sensor of presence-sensitive display device 202 (e.g., sensor of presence-sensitive input component 225) may detect a user's movement (e.g., moving a hand, an arm, a pen, a stylus) within a threshold distance of the sensor of presence-sensitive display device 202. Presence-sensitive display device 202 may determine a two- or three-dimensional vector representation of the movement and correlate the vector representation to a gesture input (e.g., a hand-wave, a pinch, a clap, a pen stroke) that has multiple dimensions. In other words, presence-sensitive display device 202 can detect a multi-dimensional gesture without requiring the user to gesture at or near a screen or surface (e.g., display component 223) at which presence-sensitive display device 202 outputs information for display. Instead, presence-sensitive display device 202 can detect a multi-dimensional gesture performed at or near a sensor which may or may not be located near the screen or surface at which presence-sensitive display device 202 outputs information for display.

One or more storage devices 250 within computing device 200 may store information for processing during operation of computing device 200 (e.g., during execution of one or more of UI module 230, applications 232, operating system 254, or digital makeup enhancement module 234). In some examples, storage devices 250 include temporary memory, meaning that a primary purpose of storage devices 250 is not long-term storage. Storage devices 250 on computing device 200 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 250, in some examples, include one or more computer-readable storage media. Storage devices 250 may be configured to store larger amounts of information than volatile memory. Storage devices 250 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 250 may store program instructions and/or data associated with one or more applications 232, UI module 230, operating system 254, and digital makeup enhancement module 234. As illustrated in FIG. 1, storage devices 250 may optionally include reference facial data 238, digital images 240, and digital makeup enhancement data 236, when these are stored locally on computing device 200. In other cases, reference facial data 238, digital images 240, and/or digital makeup enhancement data 236 may be stored remotely in the cloud. UI module 230, applications 232, digital makeup enhancement module 234, reference facial data 238, digital images 240, and digital makeup enhancement data 236 may comprise examples of corresponding UI module 130, applications 132, digital makeup enhancement module 134, reference facial data 138, digital images 140, and digital makeup enhancement data 136 shown in FIG. 1.

In certain examples, storage devices 250, or one or more of components included in storage devices 250, may be stored on one or more remote computing devices that are external to computing device 200 (e.g., on one or more external servers). In some examples, one or more remote computing devices may store and/or execute UI module 230, applications 232, and/or operating system 254. In these examples, the one or more remote computing devices may perform functionality similar to that described herein in reference to processors 220.

As shown in FIG. 2, computing device 200 may include a power source 228. In some examples, power source 228 may be a battery. Power source 228 may provide power to one or more components of computing device 2. Non-limiting examples of power source 228 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 228 may have a limited capacity (e.g., 1000-3000 mAh).

Computing device 200 also includes one or more sensors 221. In some examples, one or more of sensors 221 may be examples of one or more of input components 222. Sensors 221 may include one or more inertial measurement units. For example, sensors 221 may include one or more gyroscopes, such as one or more high-frequency gyroscopes (e.g., a 200 Hz gyroscope). As described herein, sensors 221 of computing device 200 may be configured to determine a real-time orientation or rotation of computing device 200 in three-dimensional space. In some examples, sensors 221 may also include one or more accelerometers.

Computing device 200 further includes one or more camera devices 204. Camera devices 204 may be one example of camera devices 104 shown in FIG. 1. Camera devices 204 are configured to capture one or more images during execution of an application or module (e.g., a camera application, one or more of applications 232, digital makeup enhancement module 234), such as one or more still and/or moving images. Camera devices 204 may include one or more camera devices on a front-side and/or on a rear-side of computing device 200.

Camera devices 204 may be one or more of any appropriate type of image acquisition or capture device, such as a camera or charge-coupled device. In some examples, camera devices 204 may include one or more infrared cameras with a high field-of-view and shallow depth of focus, and may include a backlit infrared camera having a particular field-of-view. In other examples, camera devices 204 may be or may further include one or more other types of cameras or image sensors, which may include one or more other infrared cameras, thermographic cameras, thermal imaging cameras, light-sensitive cameras, range sensors, tomography devices, radar devices, red-green-blue (RGB) cameras, or ultrasonic cameras. In some examples, camera devices 204 may include any image capture device appropriate for application of computer vision techniques. Depending on the type of camera devices used, the resulting images may include two-dimensional images, three-dimensional volumes, and/or an image sequence. Pixel values typically correspond to light intensity in one or more spectral bands, but might also be related to various physical measures, such as depth, absorption or reflectance of sonic or electromagnetic waves, or nuclear magnetic resonance.

One or more processors 220 may implement functionality and/or execute instructions within computing device 200. For example, processors 220 on computing device 200 may receive and execute instructions stored by storage devices 250 that execute the functionality of applications 252, operating system 254, and/or camera application 210. These instructions executed by processors 220 may cause computing device 200 to store information within storage devices 250 during program execution. Processors 220 may execute instructions of operating system 254 and applications 252 to perform one or more operations. That is, operating system 254 and applications 252 may be operable by processors 220 to perform various functions described herein.

In some alternate examples, computing device 200 may only comprise or otherwise include processors 220. In these examples, input components 222, presence-sensitive display device 202, communication units 224, output components 226, power source 228, and storage devices 250 may be external to, yet communicatively coupled with (e.g., via communication channels 227), computing device 200.

Applications 252 may include one or more different various applications. An e-mail application, a camera application, a map or navigation application, calendar application, a messaging application, a social media application, a travel application, a game application, a stock application, and a weather application are all examples of applications 252.

Figure 3B:
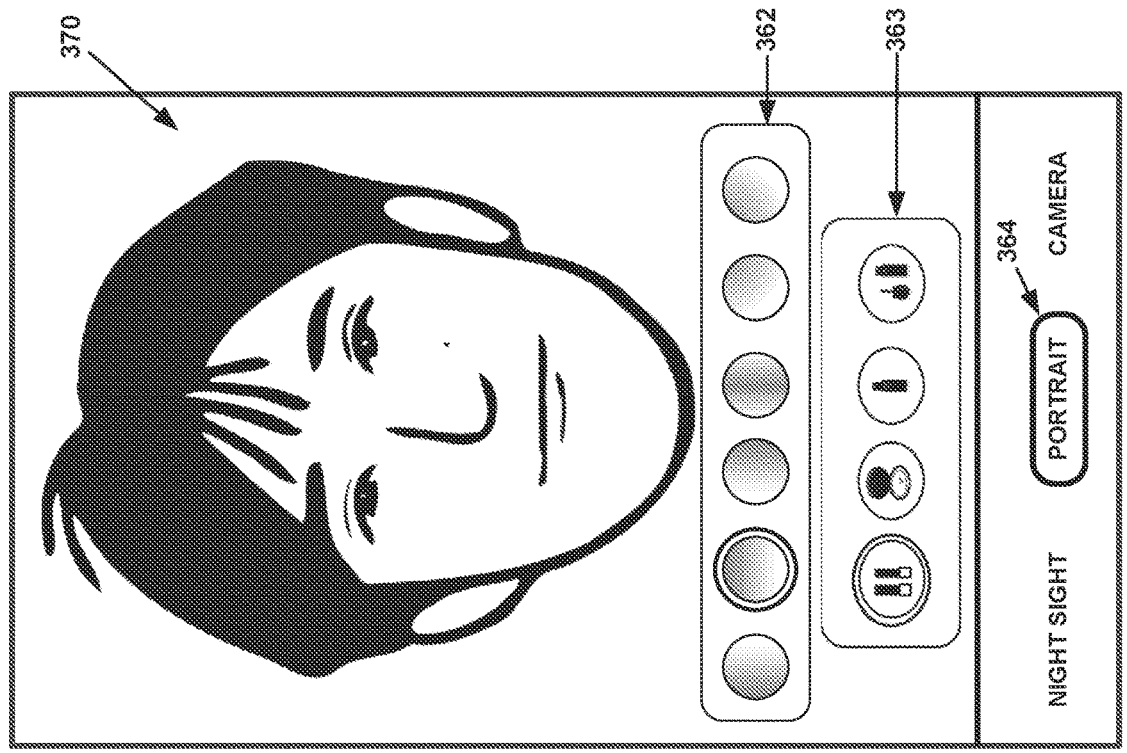
FIGS. 3A-3C are screen diagrams illustrating examples of applying and storing digital makeup enhancement data with respect to reference facial data of a digital representation of a face of an enrolled user, in accordance with one or more aspects of the present disclosure.
Figure 3A:
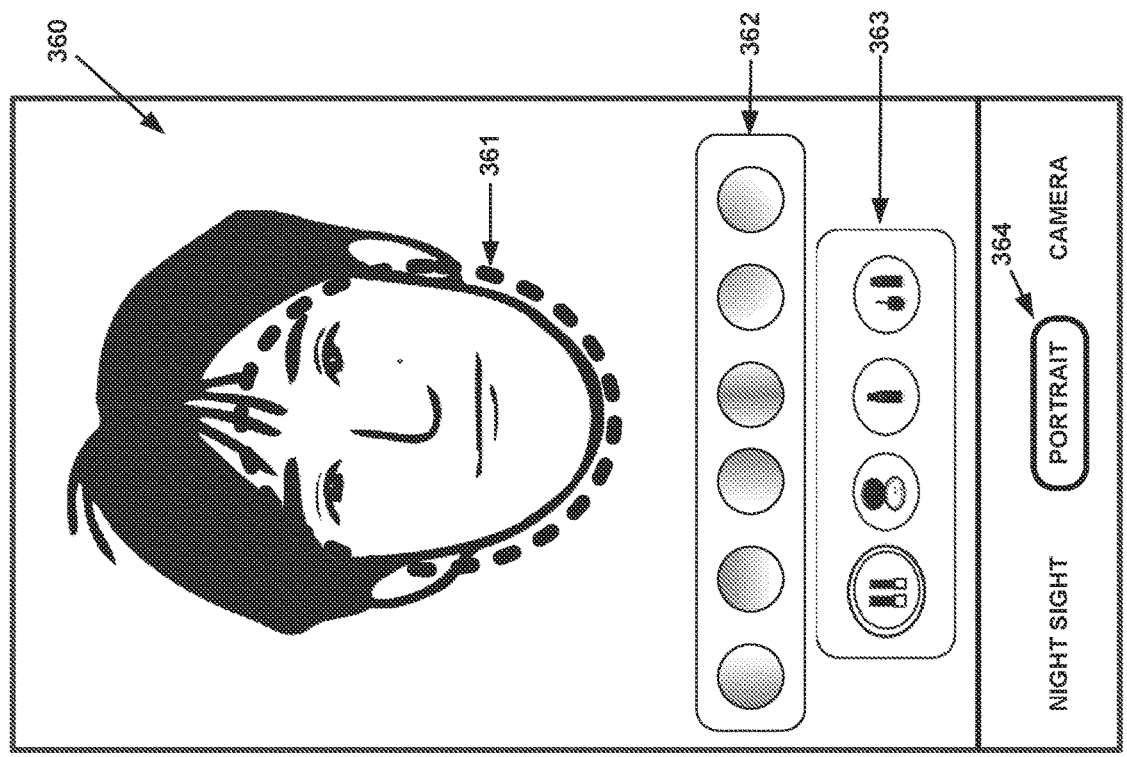
Figure 3C:
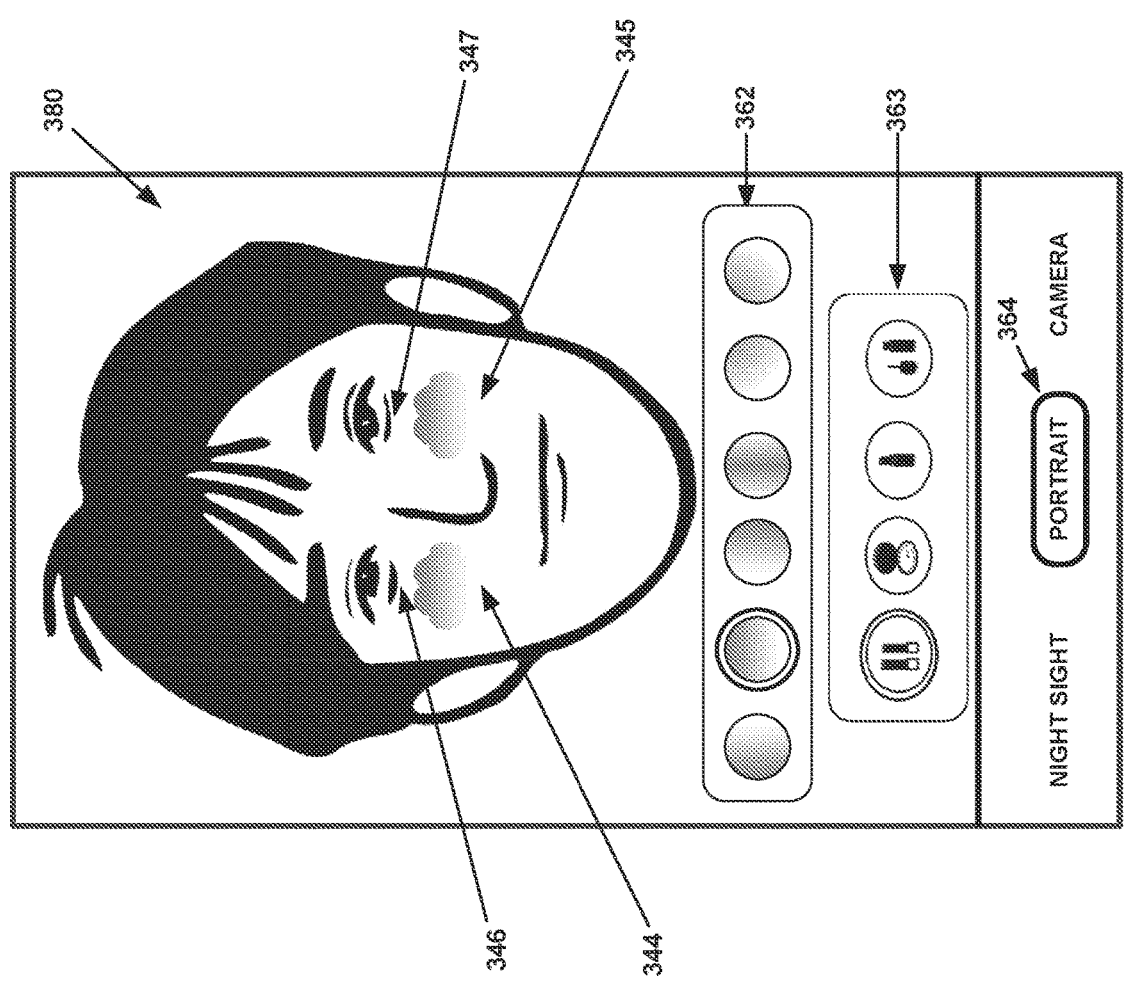

FIGS. 3A-3C are screen diagrams illustrating examples of applying and storing digital makeup enhancement data with respect to reference facial data of a face of an enrolled user, in accordance with one or more aspects of the present disclosure. A computing device, such as computing device 100 or computing device 200, may be configured to output digital images included in these screen diagrams for display. For purposes of illustration only, FIGS. 3A-3C are described in reference to computing device 200.

UI module 230 may output one or more digital images 360 (FIG. 3A), 370 (FIG. 3B), and 380 (FIG. 3C) for display. In some cases, digital images 360, 370, 380 may be images that are captured by a camera application (e.g., one of applications 232) in real time, and these may comprise one or more still or moving images. In other cases, digital images 360, 370, 380 may comprise stored images that are included, e.g., in a photo album (e.g., for stored in digital images 240). Using techniques of the present disclosure, digital makeup enhancement module 234 may perform an initial setup of selecting and storing preferred digital makeup enhancement settings for one or more enrolled users of computing device 200, which can later be applied to images of a recognized face of those enrolled users. The facial data (e.g., feature data) for any selected faces may be stored in reference facial data 238, either locally on computing device 200 or in the cloud. Digital images 360, 370 may comprise initial digital images used for enrollment, and digital image 380 may comprise a modified initial digital image based on application of selected digital makeup enhancements.

As shown in FIG. 3A, in one particular example, digital makeup enhancement module 234 may initiate the process of makeup selection for an enrolled user upon receipt of a user confirmation, such as a user selection of a graphical object 364 that corresponds to a particular makeup or portrait mode. In some cases, user selection of graphical object 364 initiates a distinct makeup or portrait mode associated with execution of digital makeup enhancement module 234. In other cases, such as when the functionality of digital makeup enhancement module 234 is included within that of other functions or modes (e.g., as an option under or within a face retouching mode), the makeup or portrait functionality may be integrated as such without having its own, separate mode.

After receiving a user selection of a graphical object 364, digital makeup enhancement module 234 may output a graphical boundary 360 around a detected face in initial digital image 360. A facial detection process may be executed, either locally on computing device 200 or remotely in the cloud, to detect a face within digital image 360 based on one or more detected facial features. Digital makeup enhancement module 234 may select the detected face for further processing based upon a selection (e.g., user selection using input components 222 and/or presence-sensitive display device 202) of graphical boundary 360.

Based on user feedback from the enrolled user, digital makeup enhancement module 234 may then select one or more digital makeup enhancements that are to be applied to the detected face of the enrolled user. In doing so, digital makeup enhancement module 234 may output one or more graphical makeup bars (e.g., graphical makeup bars 362, 363), which each include one or more makeup objects. Digital makeup enhancement module 234 may apply one or more digital makeup enhancements to the face of the enrolled user based on user selection of the makeup objects included in these graphical makeup bars. These enhancements are stored within digital makeup enhancement data 236, either locally or in the cloud. This setup may, in various cases, be performed once for each individual face of an enrolled user that is to be customized with digital makeup enhancements. In some cases, as will be described in more detail below, a user may even store multiple different enhancement settings that are associated with the same enrolled user (e.g., first makeup enhancement data associated with personal use, second makeup enhancement data associated with business use).

Upon selection of graphical border 360, digital makeup enhancement module 234 may interact with UI module 230 to output image 370, which may in some cases include an enlarged version of the face of the enrolled user. At this stage, digital makeup enhancement module 234 may provide one or digital makeup enhancement to the face of the enrolled user based upon user selection of graphical makeup bars 362 and/or 362.

In non-limiting cases, digital makeup enhancement data is associated with a digital makeup enhancement to the reference facial data of the enrolled user for one or more of an eyebrow, a cheek, an eyelash, a nose, lips, contour, or cheeks of the face of the user. In the particular example of FIG. 3B, graphical makeup bar 363 includes four distinct makeup objects associated with a lip makeup enhancement, a foundation makeup enhancement, a contour makeup enhancement, and an eyelash makeup enhancement (e.g., in left-to-right order in makeup bar 363). In FIG. 3B, the user has selected the makeup object for the lip makeup enhancement. As a result, graphical makeup bar 362 includes six distinct makeup objects associated with different lip makeup enhancement options. These options may be associated with different types, styles, colors, strengths, etc. of lip makeup enhancements. The enrolled user may select any of the makeup objects in graphical makeup bar 362 and apply the associated makeup enhancements to corresponding portions of the face of the enrolled user displayed in image 370. For example, the enrolled user may select one of the makeup objects included in graphical makeup bar 362 and apply this lip makeup enhancement to one or more portions of the lips of the face shown in 370. These portions of the lips correspond to particular reference facial data of the face of the enrolled user, such as one or more facial features for these portions of the lips.

The data that corresponds to this enhancement, as stored in digital makeup enhancement data 236, may indicate that the enhancement in a lip makeup enhancement, and may further specify the attributes of this enhancement, such as the color, style, strength, and like (e.g., such as provided in one or more name/value pairs). The stored digital makeup enhancement data corresponding to this digital makeup enhancement may also be associated specifically with the face of the enrolled user (e.g., via a unique identifier of the face of this enrolled user), as well as the particular reference facial data associated with the one or more portions of the lips, which may be included in reference facial data 238 for this digital makeup enhancement. For instance, the lips digital makeup enhancement may be associated with reference facial data (e.g., one or more facial features) for the lips of the enrolled user. The reference facial data may indicate one or more specific facial information or features, including facial location or region information (e.g., in one or more name/value pairs) associated with such features.

The enrolled user may use the makeup objects included in graphical makeup bar 363 to select and apply any number of different digital makeup enhancements to the face of the enrolled user displayed in image 370. When the user selects a particular makeup object from makeup bar 363, different respective options may be displayed in makeup bar 362. For instance, if the user selects a makeup object from makeup bar 363 associated with eyelashes or with eyeliner, makeup bar 362 may include various makeup objects associated with eyelash or eyeliner enhancements. If the user selects a makeup object from makeup bar 363 associated with foundation, makeup bar 362 may include various makeup objects associated with foundation enhancements. Each of these digital makeup enhancements may be represented or otherwise associated with corresponding data that is included in digital makeup enhancement data 236, which may indicate the type of makeup enhancement and corresponding attributes. Digital makeup enhancement module 234 may generate, based on the selected digital makeup enhancements, the corresponding digital makeup enhancement data for storage in digital makeup enhancement data 236, and may associate this data with the corresponding reference facial data 238 to which the makeup enhancement data is applied.

Digital makeup enhancement module 234 may output the digital makeup enhancements that have been applied to the face of the enrolled user. For example, FIG. 3C illustrates an example digital image 380 in which multiple example digital makeup enhancements have been applied to the face of the enrolled user of FIGS. 3A-3B. Similar to the enhancements illustrated in FIG. 1, four distinct digital makeup enhancements have been applied to the face of the enrolled user: a first digital makeup enhancement 344 (e.g., foundation enhancement) to one cheek of the user, a second digital makeup enhancement 345 (e.g., foundation enhancement) to another cheek of the user, a third digital makeup enhancement 346 (e.g., eyeliner enhancement) underneath one eye of the user, and a fourth digital makeup enhancement 347 (e.g., eyeliner enhancement) underneath another eye of the user. Each of these digital makeup enhancements may be represented or otherwise associated with corresponding data that is included in digital makeup enhancement data 236, which may indicate the type of makeup enhancement and corresponding attributes, and which may also be associated with respective reference facial data (e.g., facial data associated with the user's cheeks and/or eyes) that is included in reference facial data 238 that is stored for the enrolled user.

In certain cases, an enrolled user may also store multiple different groups of digital makeup settings or profiles in digital makeup enhancement data 236. For example, an enrolled user may choose to create and store different groups of digital makeup settings in digital makeup enhancement data 236 corresponding to different types of anticipated or desired uses. For instance, an enrolled user may wish to store a first group of enhancement settings that are associated with business or formal use. This same user, however, may also wish to store a second group of enhancement settings that are associated with personal use (e.g., for use at a party setting). Digital makeup enhancement data 236 may include any number of groups of digital makeup enhancement settings, one or more of which may be associated with the same enrolled user.

Figure 4:
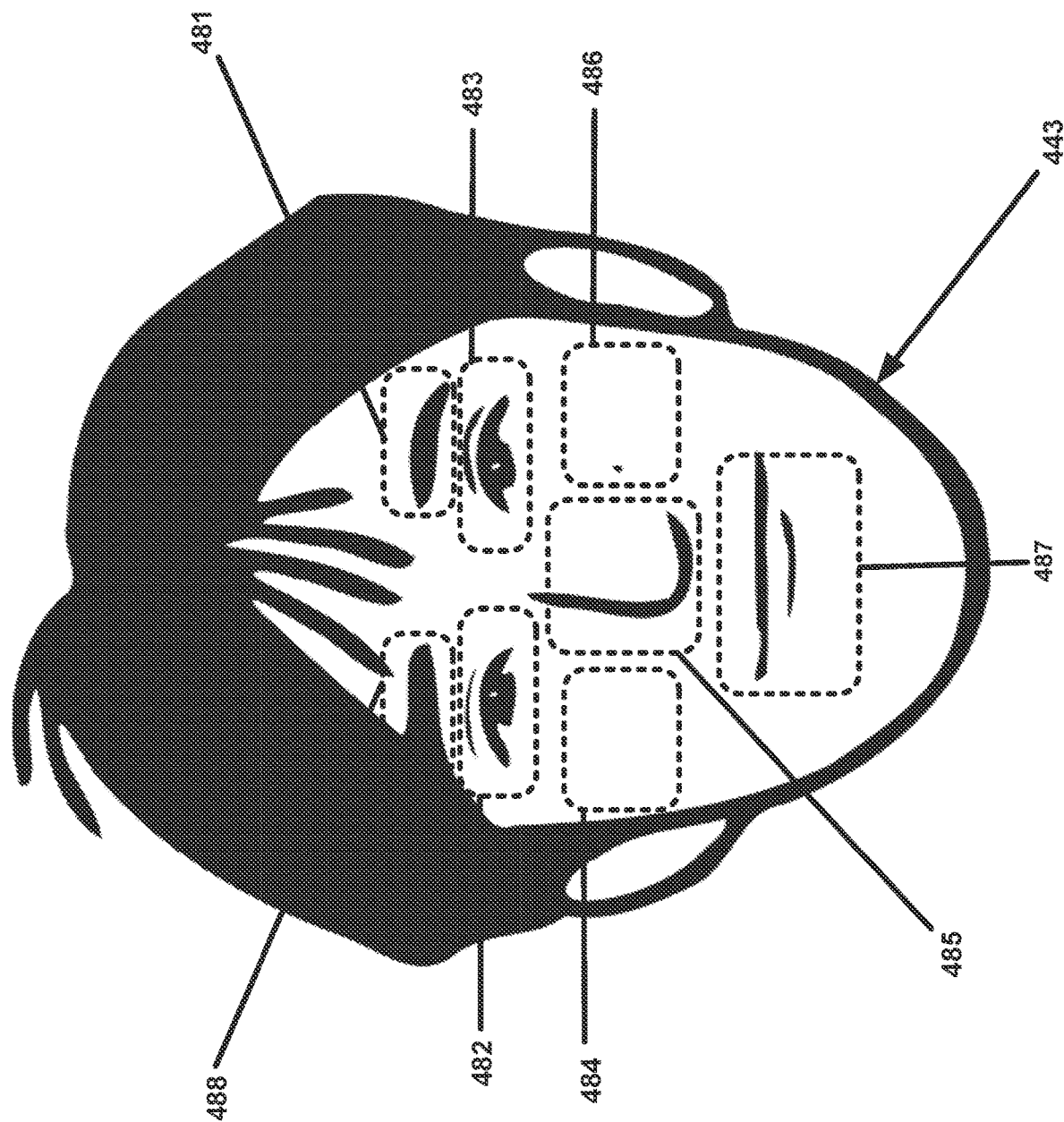
FIG. 4 is a screen diagram illustrating portions of an image that correspond to different facial features of a user, in accordance with one or more aspects of the present disclosure.

FIG. 4 is a screen diagram illustrating different portions of a digital image that correspond to different facial features of a user, in accordance with one or more aspects of the present disclosure. The example image illustrated in FIG. 4 may be one example of any of the digital images illustrated in FIG. 1 or FIGS. 3A-3C.

FIG. 4 illustrates multiple different regions or portions 488, 481, 482, 483, 484, 485, 486, 487 of face 443 included in the example digital image. Each of these portions correspond to respective facial data of face 443, such as respective facial features of face 443. This facial data may comprise reference facial data for face 443 when face 443 is one of an enrolled user.

As an example, portion 488 illustrated in FIG. 4 may correspond to facial data for a first eyebrow of face 443. This facial data may comprise or indicate one or more specific facial features (e.g., reference facial features for reference facial data of an enrolled user), including any facial location or region information (e.g., in one or more name/value pairs) on face 443 that are associated with such features, such as the first eyebrow of face 443.

Similarly, portion 481 may correspond to facial data for a second eyebrow of face 443. Portion 482 may correspond to facial data for a first eye of face 443, while portion 483 may correspond to facial data for a second eye of face 443. Portion 484 may correspond to facial data for a first cheek of face 443, while portion 486 may correspond to facial data for a second check of face 443. Portion 485 may correspond to facial data for a nose of face 443, and portion 487 may correspond to a mouth of face 443. Each of portions 481-488 may therefore correspond to respective facial data (e.g., feature data) with respect to face 443.

When digital makeup enhancement module 234 stores digital makeup enhancement data 236 and reference facial data 238 (e.g., reference facial features) for an enrolled user, such as described above in reference to FIGS. 3A-3C, digital makeup enhancement module 234 may identify the portions of the face of the enrolled user (e.g., portions 481-488 shown in FIG. 4) to which the digital makeup enhancements are applied. Digital makeup enhancement module 234 may store the digital makeup enhancement data (e.g., settings) 236 for these enhancements in association with reference facial data 238 that corresponds to the portions of the face of the enrolled user to which the enhancements are applied.

At a later point in time, as will be described further in reference to FIGS. 5A-5C, the same user may wish to use computing device 200 to apply saved digital makeup enhancement data 236 to the face of the user included in a new digital image (e.g., a real-time image captured by camera devices 204, a stored digital image included in digital images 240). Digital makeup enhancement module 234 may apply digital makeup enhancement data 236 that was previously stored for this enrolled user, and apply it to the facial data of the face of the user within one or more modified digital images. In some examples, while using camera devices 204, computing device 200 may output, for display (e.g., at display device 202), one or more real-time images captured by camera devices 204. Digital makeup enhancement module 234 may then apply digital makeup enhancement data 236 to the facial data of the digital representation of the face of the user to generate the one or more modified digital images, where the one or more modified digital images comprise one or more modified real-time images. Computing device 200 may then output, for display (e.g., at display device 202), the one or more modified real-time images to provide a live preview of the at least one corresponding digital makeup enhancement to the digital representation of the face of the user.

In doing so, after the face of the user has been recognized as the enrolled face (e.g., by one or more facial recognition processes that match the facial data associated with the face and the reference facial data associated with the face of the enrolled user), digital makeup enhancement module 234 may access the digital makeup enhancement data 236 that corresponds to the face of the enrolled user (e.g., via a unique identifier associated with the face of the enrolled user).

This retrieved digital makeup enhancement data 236 is associated with corresponding reference facial data 238 for the face of the enrolled user. Digital makeup enhancement module 234 may then identify portions of the face within the new digital image having facial data (e.g., one or more facial features) that correspond to reference facial data 238 (e.g., one or more reference facial features) of the enrolled user. Digital makeup enhancement module 234 may then apply the retrieved digital makeup enhancement data (e.g., settings) 236 that is associated with this reference facial data 238 to the facial data of the face included in the new image, thereby applying corresponding digital makeup enhancements to this face.

Figure 5A:
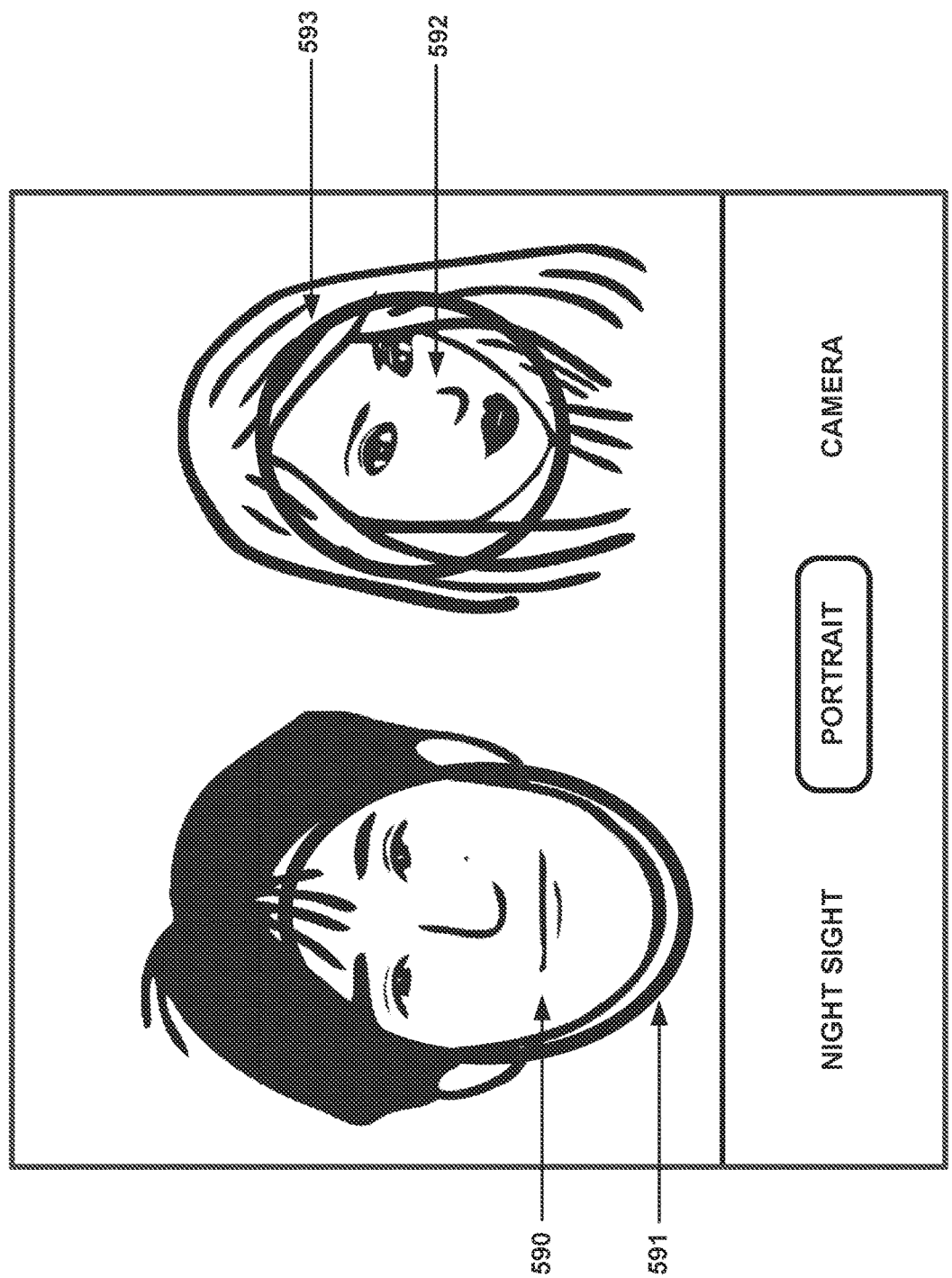
FIGS. 5A-5C are screen diagrams illustrating a selective application of stored digital makeup enhancement data to facial data of a recognized digital representation of a face of a user that is included in one or more digital images, in accordance with one or more aspects of the present disclosure.
Figure 5B:
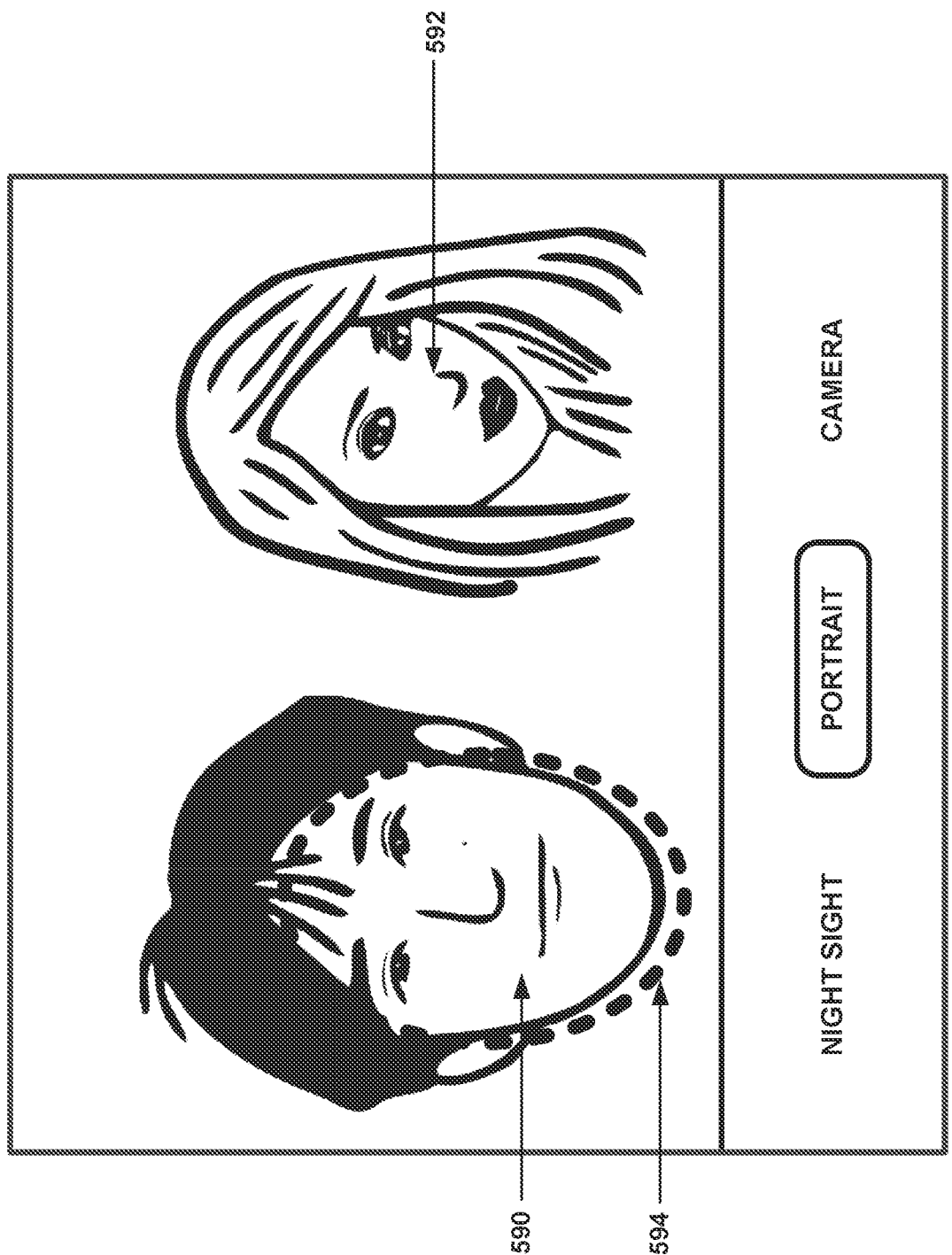
Figure 5C:
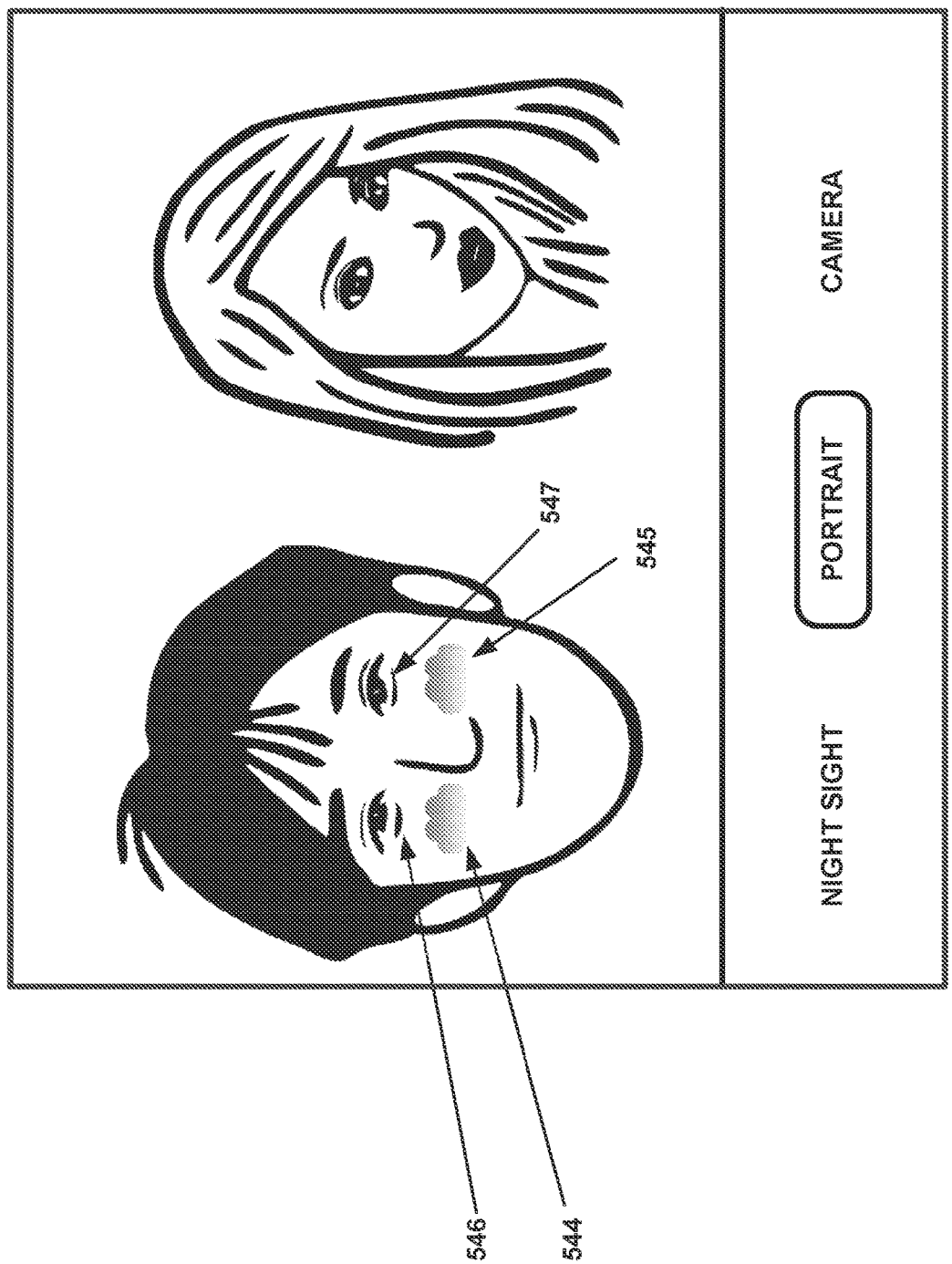

FIGS. 5A-5C are screen diagrams illustrating an example of a selective application of stored digital makeup enhancement data to facial data of a recognized face of a user that is included in one or more digital images, in accordance with one or more aspects of the present disclosure. For purposes of illustration only, the examples shown in FIGS. 5A-5C are described in reference to computing device 200 shown in FIG. 2.

As shown in FIG. 5A, a digital image includes two faces: face 590 of a first user and face 592 of a second user. Face 590 and face 592 may be included in respective first and second portions of the displayed image. In some cases, this digital image may comprise a real-time image that is displayed at presence-sensitive display device 202 based on input provided by camera devices 204 (e.g., during execution of a camera application included in applications 232). In other cases, the digital image may comprise a stored image included in digital images 240 (e.g., an image included in a stored photo album).

Digital makeup enhancement module 234 may receive (e.g. based on a facial recognition process executed locally on computing device 200 or executed remotely in the cloud) an indication of two faces included in the image, namely face 590 of the first user and face 592 of the second user. Digital makeup enhancement module 234 may output graphical indications of detection of faces 590, 592 by outputting graphical borders 591 and 593. Graphical border 591 includes a border around at least a portion of face 590, and graphical border 593 includes a border around at least a portion of face 592. Graphical borders 591 and 593 may have a distinct pattern or color (e.g., white).

Digital makeup enhancement module 234 may further receive, based on the facial recognition process, an indication of a match between facial data associated with face 590 and reference facial data associated with the face of an enrolled user (e.g., the enrolled user associated with FIGS. 3A-3C) for which digital makeup enhancement data 236 has been previously captured and stored. In response, digital makeup enhancement module 234 may change graphical border 591 and output instead a graphically emphasized border 594 (e.g., a dotted border or a border of a particular color, such as green), which at least partially surrounds face 590 of the first user, such as is shown in FIG. 5B. However, if digital makeup enhancement module 234 does not receive an indication of a recognition of face 592 with that of an enrolled user, digital makeup enhancement module 234 may not output a graphically emphasized border around face 592, but may instead maintain graphical border 593 around face 592 (e.g., the same graphical border 593). As shown in FIG. 5B, digital makeup enhancement module 234 has only recognized face 590 as one of a previously enrolled user on computing device 20, and therefore only outputs graphically emphasized border 594 around face 590 of this first user.

Upon outputting graphically emphasized border 594 around at least a portion of face 590, digital makeup enhancement module 234 may receive an indication of a user selection of face 590. For example, this first enrolled user may provide a user selection of face 590 (e.g., using input components 222 and/or presence-sensitive display 2020) to cause digital makeup enhancement module 234 to automatically retrieve and apply stored digital makeup enhancement data to the facial data associated with face 590.

Digital makeup enhancement module 234 may retrieve previously stored digital makeup enhancement data 236 for the first enrolled user (e.g., based on a unique identifier associated with this user), and may further identify the reference facial data 238 for the enrolled user that corresponds to the digital makeup enhancement data 236 that was previously applied and stored during the enrollment process (e.g., such as shown in FIGS. 3A-3C). Digital makeup enhancement module 234 may, in some cases, output, for display, a graphical indication of the retrieved digital makeup enhancement data (e.g., in a displayed menu or field). Digital makeup enhancement module 234 may then receive a selection of the graphical indication of the digital makeup enhancement data, such as by the first user, to confirm that the first user wishes computing device 200 to automatically apply the saved enhancement data to face 590.

Digital makeup enhancement module 234 may then apply the saved digital makeup enhancement data 236 to face 590, such as shown in FIG. 5C. To do so, in various examples, digital makeup enhancement module 234 may identify facial data (e.g., one or more facial features), which is associated with one or more portions of face 590, that corresponds to the reference facial data 238 (e.g., one or more reference facial features) for the face of the enrolled user associated with digital makeup enhancement data 236. Digital makeup enhancement module 234 may then apply the digital makeup enhancement data (e.g., settings) 236 to the corresponding facial data for the one or more portions of face 590. For instead, the corresponding facial data may include facial features associated with the eyes and cheeks on face 590.

As shown in the example of FIG. 5C, four distinct digital makeup enhancements have been applied to face 590, based on the previously saved makeup settings for the enrolled user (e.g., the enrolled user referenced in FIGS. 3A-3C): a first digital makeup enhancement 544 (e.g., foundation enhancement) to one cheek of the user, a second digital makeup enhancement 545 (e.g., foundation enhancement) to another cheek of the user, a third digital makeup enhancement 546 (e.g., eyeliner enhancement) underneath one eye of the user, and a fourth digital makeup enhancement 547 (e.g., eyeliner enhancement) underneath another eye of the user. Each of these digital makeup enhancements may be represented or otherwise associated with corresponding data that is included in digital makeup enhancement data 236, which may indicate the type of makeup enhancement and corresponding attributes, and which may also be associated with respective facial data (e.g., facial data associated with the user's cheeks and/or eyes).

In cases in which the user associated with face 592 is also a previously enrolled user, having previously stored enhancement data stored in digital makeup enhancement data 236, similar digital makeup enhancements may be similarly applied to face 592 of this second user, although this is not illustrated in the example of FIGS. 5B-5C.

In some cases, prior to applying digital makeup enhancements to the face of the user, such as illustrated in FIG. 5C, the user may use computing device 200 to make one or more modifications or updates to the previously stored enhancements for that user before they are applied. In these cases, digital makeup enhancement module 234 may retrieve digital makeup enhancement data 236 associated with reference facial data 238 for the user (e.g., the enrolled user), and may output an indication or representation of this data to the user. For example, digital makeup enhancement module 234 may interact with UI module 230 to output a graphical menu of various settings for digital makeup enhancement data 236 for this user.

Digital makeup enhancement module 234 may then receive an indication of at least one modification to digital makeup enhancement data 236 based on user selection. For instance, the user may interact with the graphical menu of settings to modify the settings for first digital makeup enhancement 544 (e.g., foundation enhancement) that is to be applied to one cheek of the user, and/or to third digital makeup enhancement 546 (e.g., eyeliner enhancement) that is to be applied underneath one eye of the user. These modifications may relate to any sort of adjustments, such as adjustments to the type, style, color, strength, etc., of the enhancements. Digital makeup enhancement module 234 may then generate, based on the at least one modification, modified digital makeup enhancement data, and apply the modified digital makeup enhancement data to the facial data of the face of the user to generate the modified digital images, similar to that shown in FIG. 5C.

In certain cases, and as noted earlier, a previously enrolled user may also store multiple different groups of digital makeup settings or profiles in digital makeup enhancement data 236. For example, an enrolled user may choose to create and store different groups of digital makeup settings in digital makeup enhancement data 236 corresponding to different types of anticipated or desired uses, such as a first group of enhancement settings that are associated with business or formal use. This same user, however, may also wish to store a second group of enhancement settings that are associated with personal use (e.g., for use at a party setting). Digital makeup enhancement data 236 may include any number of groups of digital makeup enhancement settings, one or more of which may be associated with the same enrolled user. In these cases, digital makeup enhancement module 234 may use UI module 230 to output a graphical menu that includes all of the groups of enhancement settings that have been previously saved for the user, and which are currently available for application. Digital makeup enhancement module 234 may then receive a selection of one of these groups of digital makeup settings for retrieval and application to the facial data of the user. For instance, if the user wishes to apply the group of settings associated with personal use for an upcoming party, the user may select the second group of enhancement settings that were previously saved and associated with personal use, and digital makeup enhancement module 234 may apply these settings to the facial data of the face of the user for output, similar to that shown in FIG. 5C.

Figure 6:
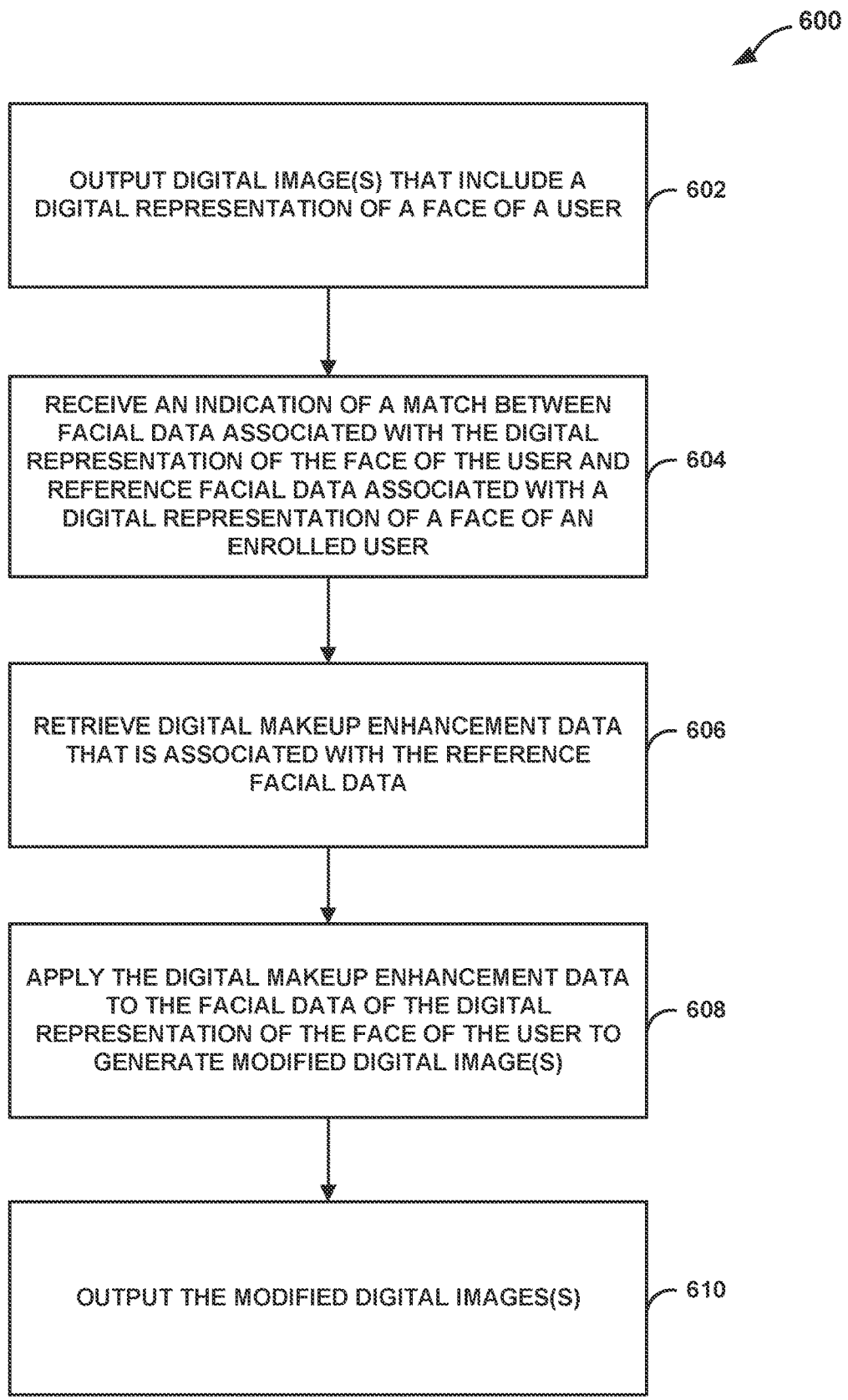
FIG. 6 is a flow diagram illustrating example operations of a computing device, in accordance with one or more aspects of the present disclosure.

FIG. 6 is a flow diagram illustrating example operations of a process 600 that is performed by a computing device, such as computing device 100 (FIG. 1) and/or computing device 200 (FIG. 2), in accordance with one or more aspects of the present disclosure. For purposes of illustration only, the operations of FIG. 6 are described with reference to computing device 200 shown in FIG. 2.

As shown in FIG. 6, digital makeup enhancement module 234 may output (602), for display (e.g., using or interacting with UI module 230), one or more digital images that include a digital representation of a face of a user. Digital makeup enhancement module 234 may receive (604), based on a facial recognition process (e.g., a process performed locally on computing device 200 by digital makeup enhancement module 234, or a process performed remotely from computing device 200 in the cloud), an indication of a match between facial data associated with the digital representation of the face of the user and reference facial data 238 associated with a digital representation of a face of an enrolled user, wherein the reference facial data is associated with digital makeup enhancement data previously stored for the enrolled user.

Digital makeup enhancement module 234 may retrieve (606) digital makeup enhancement data 236 that is associated with reference facial data 238. Digital makeup enhancement module 234 may apply (608) digital makeup enhancement data 236 to the facial data of the digital representation of the face of the user to generate one or more modified digital images that indicate at least one corresponding digital makeup enhancement to the digital representation of the face of the user. Digital makeup enhancement module 234 may then output (610), for display (e.g., using or interacting with UI module 230), the one or more modified digital images. Any of the digital images received or processed by digital makeup enhancement module 234 may be stored in digital images 240. Any of the reference facial data 238, digital images 240, and/or digital makeup enhancement data 236 may be stored locally on computing device 200 or in the cloud.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   outputting, by a computing device and for display, one or more digital images that include a digital representation of a face of a user;
   receiving, by the computing device and based on a facial recognition process, an indication of a match between facial data associated with the digital representation of the face of the user and reference facial data associated with a digital representation of a face of an enrolled user, wherein the reference facial data is associated with digital makeup enhancement data previously stored for the enrolled user, wherein the reference facial data includes a plurality of reference facial features associated with one or more portions of the digital representation of the face of the enrolled user, and wherein the digital makeup enhancement data includes at least one digital makeup setting that is associated with at least one reference facial feature of the plurality of reference facial features;
   retrieving, by the computing device, the digital makeup enhancement data that is associated with the reference facial data;
   applying, by the computing device, the digital makeup enhancement data to the facial data of the digital representation of the face of the user to generate one or more modified digital images that indicate at least one corresponding digital makeup enhancement to the digital representation of the face of the user, wherein applying the digital makeup enhancement data to the facial data further comprises:
   identifying, by the computing device, at least one facial feature associated with one or more portions of the digital representation of the face of the user, wherein the facial data includes the at least one facial feature, and wherein the at least one facial feature corresponds to the at least one reference facial feature; and applying, by the computing device, the at least one digital makeup setting to the at least one facial feature; and outputting, by the computing device and for display, a live preview of the at least one corresponding digital makeup enhancement to the digital representation of the face of the user by at least outputting the one or more modified digital images.

2. The method of claim 1, further comprising:

after receiving the indication of the match between the facial data associated with the digital representation of the face of the user and the reference facial data associated with the digital representation of the face of the enrolled user, outputting, by the computing device and for display, a graphically emphasized border that at least partially surrounds the digital representation of the face of the user included in the one or more digital images;

receiving, by the computing device, a selection of the digital representation of the face of the user included in the one or more digital images;

outputting, by the computing device and for display, a graphical indication of the digital makeup enhancement data; and receiving, by the computing device, a selection of the graphical indication of the digital makeup enhancement data.

3. The method of claim 1, further comprising:

before retrieving the digital makeup enhancement data:
  outputting, by the computing device and for display, one or more initial digital images that include the digital representation of the face of the enrolled user;
  receiving, by the computing device, a selection of one or more digital makeup enhancements for application to the reference facial data of the digital representation of the face of the enrolled user;
  generating, by the computing device and based on the selected one or more digital makeup enhancements, the digital makeup enhancement data; and
  providing, by the computing device, the digital makeup enhancement data for storage in association with the reference facial data.

4. The method of claim 3, further comprising:

applying, by the computing device, the selected one or more digital makeup enhancements to the reference facial data of the digital representation of the face of the enrolled user to generate one or more modified initial digital images that indicate at least one corresponding digital makeup enhancement to the digital representation of the face of the enrolled user; and outputting, by the computing device and for display, the one or more modified initial digital images.

5. The method of claim 1, further comprising:

after retrieving the digital makeup enhancement data associated with the reference facial data:
  receiving, by the computing device, an indication of at least one modification to the digital makeup enhancement data; and
  generating, by the computing device and based on the at least one modification, modified digital makeup enhancement data, wherein applying the digital makeup enhancement data comprises applying, by the computing device, the modified digital makeup enhancement data to the facial data of the digital representation of the face of the user to generate the one or more modified digital images.

6. The method of claim 1, wherein the digital makeup enhancement data comprises a first group of digital makeup settings associated with the enrolled user, wherein the enrolled user is further associated with a second group of digital makeup settings, and wherein the method further comprises:
  after receiving the indication of the match between the facial data associated with the digital representation of the face of the user and the reference facial data associated with the digital representation of the face of the enrolled user, receiving, by the computing device, a selection of the first group of digital makeup settings for retrieval and application to the facial data of the user.

7. The method of claim 1, wherein the user comprises a first user, and the method further comprising:

performing, by the computing device, at least one sharing operation that comprises one or more of:
  sending, by the computing device and to another device, the digital makeup enhancement data associated with the first user;
  receiving, by the computing device and from the other device, digital makeup enhancement data associated with a second user;
  receiving, by the computing device and from the other device, the digital makeup enhancement data associated with the first user; or
  generating, by the computing device and based on input from the second user, the digital makeup enhancement data associated with the first user.

8. The method of claim 1, wherein the user comprises a first user, wherein the facial data comprises first facial data, wherein the reference facial data comprises first reference facial data, wherein the digital makeup enhancement data comprises first digital makeup enhancement data, wherein a first portion of the one or more digital images includes the digital representation of the face of the user, wherein a second portion of the one or more digital images includes a digital representation of a face of a second user, and wherein the method further comprises:
  receiving, by the computing device and based on the facial recognition process, an indication of a match between second facial data associated with the digital representation of the face of the second user and second reference facial data associated with a digital representation of a face of a second enrolled user, wherein the second enrolled user was previously enrolled on the computing device;
  retrieving, by the computing device, second digital makeup enhancement data for the second reference facial data that is associated with the digital representation of the face of the second enrolled user;
  applying, by the computing device, the second digital makeup enhancement data to the second facial data of the digital representation of the face of the second user to generate one or more further modified digital images that indicate at least one corresponding second makeup enhancement to the digital representation of the face of the second user; and
  outputting, by the computing device and for display, the one or more further modified digital images.

9. The method of claim 8, wherein retrieving the second digital makeup enhancement data comprises receiving, by the computing device and from another device associated with the second user via at least one sharing operation, the second digital makeup enhancement data associated with the second user.

10. The method of claim 1, further comprising:
capturing, by the computing device using at least one camera device, the one or more digital images, the one or more digital images comprising one or more real-time images,
wherein applying the digital makeup enhancement data comprises, responsive to capturing the one or more real-time images using the at least one camera device, applying, by the computing device, the digital makeup enhancement data to the facial data of the digital representation of the face of the user to generate the one or more modified digital images, the one or more modified digital images comprising one or more modified real-time images, and
wherein outputting the live preview of the at least one corresponding digital makeup enhancement to the digital representation of the face of the user further comprises outputting, by the computing device and for display, the one or more modified real-time images.

11. The method of claim 1, further comprising:
retrieving, by the computing device, at least one of the one or more digital images from a stored digital photo album.

12. The method of claim 1, further comprising:
performing, by the computing device, the facial recognition process on the one or more digital images;
retrieving, by the computing device, the reference facial data associated with the digital representation of the face of the enrolled user;
comparing, by the computing device, the facial data associated with the digital representation of the face of the user to the reference facial data associated with the digital representation of the face of the enrolled user; and
providing, by the computing device and based on the comparing, the indication of the match between the facial data associated with the digital representation of the face of the user and the reference facial data associated with the digital representation of the face of the enrolled user.

13. The method of claim 1, further comprising:
sending, by the computing device and to an external device, information associated with the one or more digital images,
wherein receiving the indication of the match comprises receiving, by the computing device and from the external device, based on the facial recognition process performed by the external device, the indication of the match between the facial data associated with the digital representation of the face of the user and the reference facial data associated with the digital representation of the face of the enrolled user.

14. The method of claim 1, further comprising:
storing, by the computing device in at least one data store, the digital makeup enhancement data that is associated with the reference facial data; and
storing, by the computing device in the at least one data store, the one or more modified digital images.

15. The method of claim 1,
wherein the one or more digital images comprise one or more still or moving images, and
wherein the one or more modified digital images comprise one or more modified still or moving images.

16. The method of claim 1,
wherein applying the digital makeup enhancement data comprises applying, by the computing device and using a three-dimensional makeup rendering process, the digital makeup enhancement data to the facial data of the face of the user to provide one or more three-dimensional makeup enhancements, and
wherein outputting the one or more modified digital images comprises outputting, by the computing device and for display, one or more modified real-time images to provide an indication of the one or more three-dimensional makeup enhancements to the face of the user.

17. The method of claim 1, wherein the digital makeup enhancement data is associated with a digital makeup enhancement to the facial data of one or more of an eyebrow, a cheek, an eyelash, a nose, a contour, lips, or cheeks of the digital representation of the face of the user.

18. A computing device, comprising:
a display device;
at least one processor; and
a computer-readable storage device configured to store instructions that are executable by the at least one processor to:
output, for display at the display device, one or more digital images that include a digital representation of a face of a user;
receive, based on a facial recognition process, an indication of a match between facial data associated with the digital representation of the face of the user and reference facial data associated with a digital representation of a face of an enrolled user, wherein the reference facial data is associated with digital makeup enhancement data previously stored for the enrolled user, wherein the reference facial data includes a plurality of reference facial features associated with one or more portions of the digital representation of the face of the enrolled user, and wherein the digital makeup enhancement data includes at least one digital makeup setting that is associated with at least one reference facial feature of the plurality of reference facial features;
retrieve the digital makeup enhancement data that is associated with the reference facial data;
apply the digital makeup enhancement data to the facial data of the digital representation of the face of the user to generate one or more modified digital images that indicate at least one corresponding digital makeup enhancement to the digital representation of the face of the user, wherein to apply the digital makeup enhancement data to the facial data, the instructions are further executable by the at least one processor to:
identify at least one facial feature associated with one or more portions of the digital representation of the face of the user, wherein the facial data includes the at least one facial feature, and wherein the at least one facial feature corresponds to the at least one reference facial feature; and
apply the at least one digital makeup setting to the at least one facial feature; and
output, for display at the display device, a live preview of the at least one corresponding digital makeup enhancement to the digital representation of the face of the user by at least outputting the one or more modified digital images.

19. A non-transitory computer-readable storage device storing instructions that, when executed, cause at least one processor of a computing device to perform operations comprising:
   outputting, for display, one or more digital images that include a digital representation of a face of a user;
   receiving, based on a facial recognition process, an indication of a match between facial data associated with the digital representation of the face of the user and reference facial data associated with a digital representation of a face of an enrolled user, wherein the reference facial data is associated with digital makeup enhancement data previously stored for the enrolled user, wherein the reference facial data includes a plurality of reference facial features associated with one or more portions of the digital representation of the face of the enrolled user, and wherein the digital makeup enhancement data includes at least one digital makeup setting that is associated with at least one reference facial feature of the plurality of reference facial features;
   retrieving the digital makeup enhancement data that is associated with the reference facial data;
   applying the digital makeup enhancement data to the facial data of the digital representation of the face of the user to generate one or more modified digital images that indicate at least one corresponding digital makeup enhancement to the digital representation of the face of the user, wherein applying the digital makeup enhancement data to the facial data further comprises:
      identifying at least one facial feature associated with one or more portions of the digital representation of the face of the user, wherein the facial data includes the at least one facial feature, and wherein the at least one facial feature corresponds to the at least one reference facial feature; and
      applying the at least one digital makeup setting to the at least one facial feature; and
   outputting, for display, a live preview of the at least one corresponding digital makeup enhancement to the digital representation of the face of the user by at least outputting the one or more modified digital images.

* * * * *